United States Patent
Tajima et al.

(10) Patent No.: US 10,040,056 B2
(45) Date of Patent: Aug. 7, 2018

(54) METHOD FOR PREPARING VISIBLE LIGHT-RESPONSIVE PHOTOCATALYST AND VISIBLE LIGHT-RESPONSIVE PHOTOCATALYST INTERMEDIATE

(71) Applicant: KANAGAWA UNIVERSITY, Kanagawa (JP)

(72) Inventors: Kazuo Tajima, Kanagawa (JP); Yoko Imai, Kanagawa (JP)

(73) Assignee: KANAGAWA UNIVERSITY, Kanagawa (JP)

(*) Notice: Subject to any disclaimer, the term of this patent is extended or adjusted under 35 U.S.C. 154(b) by 664 days.

(21) Appl. No.: 14/120,423

(22) Filed: Mar. 7, 2014

(65) Prior Publication Data

US 2015/0251166 A1 Sep. 10, 2015
US 2016/0151763 A9 Jun. 2, 2016

(30) Foreign Application Priority Data

Mar. 7, 2013 (JP) .................... 2013-045977

(51) Int. Cl.
*B01J 23/52* (2006.01)
*B01J 21/06* (2006.01)
(Continued)

(52) U.S. Cl.
CPC ............ *B01J 23/52* (2013.01); *B01J 19/127* (2013.01); *B01J 21/063* (2013.01); *B01J 35/004* (2013.01);
(Continued)

(58) Field of Classification Search
CPC .......... B01J 37/0203; B01J 37/0201; B01J 37/0205; B01J 37/0211; B01J 37/0213;
(Continued)

(56) References Cited

U.S. PATENT DOCUMENTS 4,612,298 A * 9/1986 Hettinger, Jr. ......... B01J 29/084
502/64
7,741,376 B2 * 6/2010 Toki ...................... C08F 291/00
106/287.18
(Continued)

FOREIGN PATENT DOCUMENTS

JP H02268835 A 11/1990
JP 2002320664 A 11/2002
(Continued)

OTHER PUBLICATIONS

English-language abstract of CN101487814 (Derwent).*
(Continued)

*Primary Examiner* — Philip C Tucker
*Assistant Examiner* — Jimmy R Smith, Jr.
(74) *Attorney, Agent, or Firm* — Cantor Colburn LLP

(57) ABSTRACT

To provide a method for preparing a visible light-responsive photocatalyst and a visible light-responsive photocatalyst intermediate, a usage of a visible light-responsive photocatalyst, and the visible light-responsive photocatalyst, the method enabling arbitrary setting of the amount of solvent, thus making it possible to prepare composite fine particles of gold colloids and titanium oxide fine particles in high yield. A method for preparing a visible light-responsive photocatalyst or a visible light-responsive photocatalyst intermediate includes the step of forming a disperse system including an oil liquid containing an organic titanium complex as a dispersant, and an aqueous dispersion containing gold colloids as a dispersoid, and the visible light-responsive photocatalyst or the visible light-responsive photocatalyst intermediate enables the organic titanium complex to undergo hydrolysis to cause clathration of gold colloids, thus forming a clathrate.

10 Claims, 12 Drawing Sheets

(51) Int. Cl.
*B01J 35/00* (2006.01)
*B01J 37/03* (2006.01)
*B01J 37/04* (2006.01)
*B01J 37/02* (2006.01)
*B01J 37/08* (2006.01)
*B01J 35/08* (2006.01)
*B01J 19/12* (2006.01)
*B01J 37/34* (2006.01)

(52) U.S. Cl.
CPC ........... *B01J 35/006* (2013.01); *B01J 35/008* (2013.01); *B01J 35/0013* (2013.01); *B01J 35/08* (2013.01); *B01J 37/0213* (2013.01); *B01J 37/0221* (2013.01); *B01J 37/0225* (2013.01); *B01J 37/0228* (2013.01); *B01J 37/033* (2013.01); *B01J 37/035* (2013.01); *B01J 37/04* (2013.01); *B01J 37/08* (2013.01); *B01J 37/345* (2013.01); *B01J 37/0203* (2013.01); *B01J 37/0209* (2013.01); *B01J 37/0211* (2013.01)

(58) Field of Classification Search
CPC . B01J 37/08; B01J 38/02; B01J 21/063; B01J 37/033
USPC .................................................. 502/308, 309
See application file for complete search history.

(56) References Cited

U.S. PATENT DOCUMENTS

| | | | |
|---|---|---|---|
| 2007/0128439 A1* | 6/2007 | Kim | B01J 13/02 427/212 |
| 2009/0011002 A1* | 1/2009 | Zabicky | A61K 9/127 424/450 |
| 2009/0093361 A1 | 4/2009 | Sakatani | |
| 2011/0059264 A1* | 3/2011 | Park | C08J 7/18 427/510 |

FOREIGN PATENT DOCUMENTS

| | | |
|---|---|---|
| JP | 2004141737 A | 5/2004 |
| JP | 2005342601 A | 12/2005 |

OTHER PUBLICATIONS

Yu, J., et al., "Hydrothermal Preparation and Photocatalytic Activity of Mesoporous Au-TiO2 Nanocomposite Microspheres", Journal of Colloid and Interface Science, 334 (Jun. 2009), pp. 58-64.*
Machine translation of JP 2005342601, Dec. 2005.*
Extended European Search Report issued to international application No. 14158304.7-1352, dated May 16, 2014.
Hyun- Woo Kwon et al., "Synthesis of Au/TiO2 Core-Shell Nanoparticles from Titanium Isopropoxide and Thermal Resistance Effect of TiO 2 Shell", Japanese Journal of Applied Physics, vol. 46, No. 4B, Apr., 2007, pp. 2567-2570.
Mariko Takayanagi et al, "Sustaining Effect of Gold Colloids on the Amorphous Titanium Dioxide Particles", Chemistry Letters, vol. 37, No. 1, (2008), pp. 14-15, Month of publ. unknown.
Yu, J. et al., "Hydrothermal preparation and photocatalytic activity of mesoporous Au-TiO2 nanocomposite microspheres", Journal of Colloid and Interface Science, vol. 334, No. 1, (Jun. 2009) pp. 58-64.
Notification of Reason for Refusal for corresponding JP Application No. 2014-039365; dated Mar. 27, 2018.

* cited by examiner

US 10,040,056 B2

METHOD FOR PREPARING VISIBLE LIGHT-RESPONSIVE PHOTOCATALYST AND VISIBLE LIGHT-RESPONSIVE PHOTOCATALYST INTERMEDIATE

This application is based on and claims the benefit of priority from Japanese Patent Application No. 2013-045977, filed on 7 Mar. 2013, the content of which is incorporated herein by reference.

BACKGROUND OF THE INVENTION

Field of the Invention

The present invention relates to a method for preparing a visible light-responsive photocatalyst and a visible light-responsive photocatalyst intermediate, a usage of a visible light-responsive photocatalyst, and the visible light-responsive photocatalyst.

Related Art

Numerous products have recently been developed by utilizing an oxidation-reduction reaction with a semiconductor photocatalyst. There have been developed practical products for everyday life, for example, tunnel lightings which exhibit a self-cleansing action due to a photocatalyst applied, tiles which exhibit an antibacterial action due to a photocatalyst added, clothes made by knitting fibers mixed with a photocatalyst, and the like.

Most of photocatalysts used in these products are titanium oxides. Titanium oxide is widely used because of the following reasons. That is, titanium oxide exhibits extremely high catalytic activity upon irradiation with light and also does not dissolve in water or an organic solvent; and titanium oxide is stable, non-toxic, comparatively inexpensive, and has a plenitude of natural resources.

Brookite-type, anatase-type, rutile-type, and the like are known as crystal forms of titanium oxide. In order to enable the titanium oxide to exhibit a photocatalytic function, anatase-type requires ultraviolet light of 380 nm or less, and rutile-type requires ultraviolet light of 400 nm or less. However, main light constituting sunlight is visible light having wavelength of 400 nm to 800 nm, and the amount of ultraviolet light of 380 nm or less required for titanium oxide to exhibit a photocatalytic function only accounts for about 3% of the total light. That is, the amount of ultraviolet light of sunlight is a very small amount as light which enables exhibition of a photocatalytic function of titanium oxide. Main light of a fluorescent lamp is also visible light having a wavelength of 400 nm to 650 nm.

In light of these circumstances, there is an urgent need to develop a visible light-responsive catalyst which does not respond to ultraviolet light which only exists in a small amount, but respond to visible light which can be gained in a large amount, leading to activation.

There has been found, as a visible light sensitization method of titanium oxide, a method in which composite fine particles of gold colloids and titanium oxide fine particles are formed and plasmon-mediated light emission of gold colloids are utilized. There has also been developed, as a method for preparing composite fine particles of gold colloids and titanium oxide, a method in which composite fine particles are prepared by a reverse micelle method (see Patent Document 1).

[Patent Document 1] Japanese Unexamined Patent Application, Publication No. 2005-342601

SUMMARY OF THE INVENTION

However, in the case composite fine particles of gold colloids and titanium oxide are prepared by a reverse micelle method, there was a problem that gold colloids only exist in part of reversed micelles, resulting in poor yield, and also a large amount of solvent is required. Therefore, the method for preparing composite fine particles of gold colloids and titanium oxide using a reverse micelle method was not practical as a method for preparing a visible light-responsive photocatalyst.

The present invention has been made in light of the above-mentioned circumstances, and an object thereof is to provide a method for preparing a visible light-responsive photocatalyst and a visible light-responsive photocatalyst intermediate, which does not require a large amount of solvent, and is also capable of preparing composite fine particles of gold colloids and titanium oxide fine particles in high yield, and also a usage of the visible light-responsive photocatalyst and the visible light-responsive photocatalyst.

The present inventors have found that formation of a disperse system, which includes an oil liquid containing an organic titanium complex as a dispersant, and an aqueous dispersion containing gold colloids as a dispersoid, thus making it possible to enable arbitrary setting of the amount of solvent, and to prepare a visible light-responsive photocatalyst in high yield, therefor the present invention has been completed. Specifically, the present invention provides the followings.

(1) A method for preparing a visible light-responsive photocatalyst or a visible light-responsive photocatalyst intermediate, the method including the step of forming a disperse system comprising an oil liquid containing an organic titanium complex as a dispersant, and an aqueous dispersion containing gold colloids as a dispersoid, wherein the organic titanium complex undergoes hydrolysis to cause clathration of gold colloids, thus forming a clathrate.

(2) The method according to (1), wherein the organic titanium complex and the gold colloids are used in the amount such that a molar ratio of Au:Ti becomes 1:150 to 1:1,000.

(3) The method according to (1) or (2), further including the step of separating the clathrate from the disperse system.

(4) The method according to (3), further including the step of heating the clathrate at a temperature lower than an anatase phase transition temperature or a temperature lower than 350° C.

(5) The method according to any one of (1) to (4), further including the step of bonding the clathrate to a substrate on which a fixing agent is bonded, through the fixing agent.

(6) The method according to (5), wherein the fixing agent contains a polyvalent metal alkoxide or an alkoxysilane.

(7) The method according to (5) or (6), further including the step of drying the clathrate fixed to the substrate.

(8) The method according to (7), further including the step of heating the clathrate after drying at a temperature lower than an anatase phase transition temperature or a temperature lower than 350° C.

(9) The method according to any one of (1) to (8), further including the step of removing some adsorbed substances existing on a surface of the visible light-responsive photocatalyst to regenerate catalytic activity.

(10) The method according to (9), the removal includes the step of heating at a temperature lower than an anatase phase transition temperature or a temperature lower than 350° C.

(11) A usage of a visible light-responsive photocatalyst, comprising the step of irradiating a visible light-responsive photocatalyst comprising a clathrate in which at least a part of gold particles is clathrated by trivalent titanium oxide with light of which total illuminance of wavelengths within a range of 400 to 650 nm is 0.040 mW/cm² or more.

(12) A visible light-responsive photocatalyst which is used by being irradiated with light of which total illuminance of wavelengths within a range of 400 to 650 nm is 0.040 mW/cm² or more and comprises a clathrate in which at least a part of gold particles is clathrated by trivalent titanium oxide.

According to the present invention, formation of a disperse system including an oil liquid containing an organic titanium complex as a dispersant, and an aqueous dispersion containing gold colloids as a dispersoid, thus making it possible to enable arbitrary setting of the amount of solvent, and to prepare a visible light-responsive photocatalyst in high yield.

DETAILED DESCRIPTION OF THE INVENTION

Figure 1:
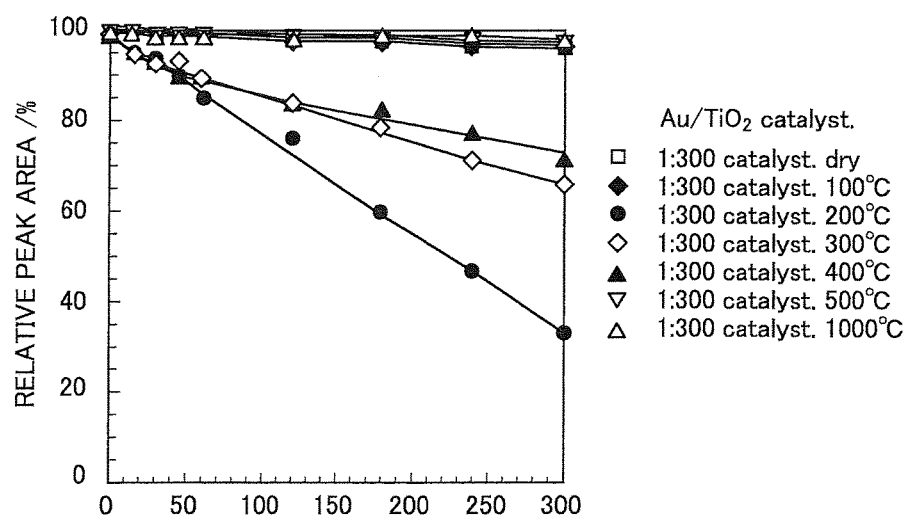
FIG. 1 is a graph showing that a powder-type visible light-responsive photocatalyst, which is obtained by a preparation method according to an example of the present invention, responds to visible light to be imparted with activity.

While embodiments of the present invention will be described below, the present invention is not particularly limited thereto.

A preparation method of the present invention includes the step of forming a disperse system including an oil liquid containing an organic titanium complex as a dispersant, and an aqueous dispersion containing gold colloids as a dispersoid. This enables arbitrary setting of the amount of solvent, thus making it possible to prepare a visible light-responsive photocatalyst intermediate or a visible light-responsive photocatalyst in high yield.

The visible light-responsive photocatalyst refers to a catalyst which responds to a wavelength in a visible light region to exhibit activity. The visible light-responsive photocatalyst intermediate is a precursor of the visible light-responsive photocatalyst, and it is converted into a visible light-responsive photocatalyst by dehydration condensation of titanium hydroxide contained in the intermediate. As long as titanium hydroxide undergoes dehydration condensation, the method is not particularly limited. For example, dehydration condensation may be performed by performing processing such as heating.

The organic titanium complex is hydrolyzed into titanium hydroxide at an aqueous dispersion interface to cause clathration of gold colloids, thus forming a clathrate. The aqueous dispersion contains gold colloids in advance. Furthermore, formation of a disperse system of the present invention enables holding of gold colloids in the dispersion. Therefore, in the place where an organic titanium complex undergoes hydrolysis to form titanium hydroxide, gold colloids exist with high probability. Therefore, a yield of the clathrate formed by clathration of gold colloids due to titanium hydroxide increases, thus enabling reduction in amount of gold colloids to be used in the preparation of the visible light-responsive catalyst. Meanwhile, in the case of forming reversed micelles, the organic titanium complex undergoes hydrolysis in reversed micelles. However, since gold colloids exist only in part of the reversed micelles, the amount of titanium hydroxide which causes clathration of gold colloids becomes small. Namely, according to the present invention, it is possible to prepare a visible light-responsive photocatalyst in higher yield than a method for preparing a visible light-responsive photocatalyst using a conventional reverse micelle method.

Because of low yield in the method for preparing a visible light-responsive catalyst using a reverse micelle method, it is necessary to use a large amount of solvent so as to prepare a large amount of the visible light-responsive catalyst. To the contrary, formation of the disperse system of the present invention enables arbitrary setting of the amount of the solvent without indispensably requiring a large amount of the solvent.

In the dispersoid, stirring may be performed so as to uniformly disperse gold colloid particles and titanium hydroxide. In the aqueous dispersion in which the clathrate exists, impurity ion species and organic substances, which do not interact with titanium ions, may or may not exist.

There is no particular limitation on a ratio of the organic titanium complex to the gold colloids, but a molar ratio Au:Ti is preferably from 1:1 to 1:1,500, more preferably from 1:500 to 1:1,200, and most preferably from 1:700 to 1:1,000, in view of being capable of reducing the amount of the gold colloids. From another point of view, a ratio of the organic titanium complex to the gold colloids is preferably from 1:150 to 1:1,000, more preferably from 1:200 to 1:800, most preferably from 1:250 to 1:500, in terms of a molar ratio Au:Ti, in view of high catalytic activity.

The organic titanium complex is not particularly limited as long as it undergoes hydrolysis to form titanium hydroxide, and may also be, for example, a titanium alkoxide. The titanium alkoxide includes, for example, tetramethoxytitanium, tetraethoxytitanium (TEOT), tetrapropoxytitanium, tetraisopropoxytitanium, tetrabutoxytitanium (TBOT), tetraisobutoxytitanium, diisopropoxydibutoxytitanium, di-tert-butoxydiisopropoxytitanium, tetra-tert-butoxytitanium, tetraisooctoxytitanium, and tetrastearoxytitanium. These titanium alkoxides can be used alone or as a mixture of two or more kinds thereof.

The organic titanium complex is hydrolyzed into titanium hydroxide. Titanium hydroxides are converted into trivalent titania as a result of mutual condensation reaction. In the present invention, a violet-colored trivalent titania as a clathrate is converted into a visible light-responsive photocatalyst. Hereinafter, description will be made on a mechanism in which trivalent titania functions as the visible light-responsive photocatalyst.

Titanium oxide in the clathrate exists as trivalent titania. The trivalent titania is oxidized and transits to tetravalent titania (anatase-type) by irradiation with visible light in the presence of oxygen. In that case, oxygen radicals are generated to decompose a compound containing benzene ring or unsaturated bond. A state of trivalent titania cannot be maintained in the oxygen atmosphere. If trivalent titania transits to energetically stable tetravalent anatase-type titania, the tetravalent anatase-type titania does not return to trivalent titania. According to resolution by the above-mentioned transition, it is impossible to utilize repeatedly or to utilize over a long period of time.

If the clathrate is irradiated with visible light, gold colloid particles in the clathrate causes plasmon-mediated light emission. In that case, electron transfer arises in trivalent titania to generate active oxygen. Namely, inclusion of gold colloids in the clathrate enables repetitive generation of active oxygen in a state of trivalent titania when irradiated with visible light. In other words, it is considered that the change into tetravalent titania is suppressed by the gold colloid even when the electron transfer arises in trivalent titania. It is also considered that trivalent titania changes into tetravalent titania in the clathrate in which the gold colloid is not present, and the tetravalent titania remains as it is to cause deactivation of the clathrate. The active oxygen thus generated has resolution of benzene ring or unsaturated bond.

According to the present invention, light absorption site of a substance to be decomposed has resolution whether it exists in either a visible light region or an ultraviolet light site. For example, it is possible to decompose a benzene ring or an unsaturated bond of methyl orange (MO) (Chem.1), tryptophan (Chem.2), Quercetin (Chem.3) as a dye, fenitrothion (Chem.4) as a pesticide, Sunset Yellow (Chem.5) as an edible yellow colorant, 2,4-D (Chem.6) as a herbicide, and the like. It is also possible to decompose a state of the substance to be decomposed in a vapor phase, a liquid phase, and a solid phase.

[Chem. 1]

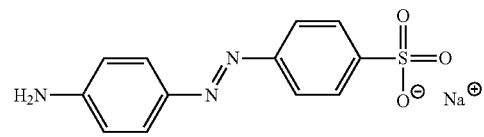

[Chem. 2]

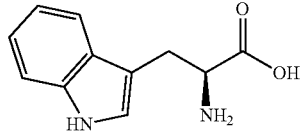

[Chem. 3]

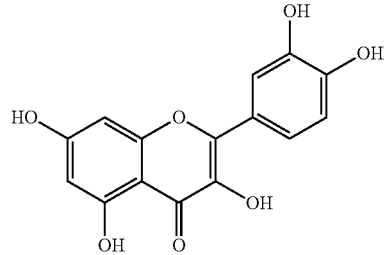

[Chem. 4]

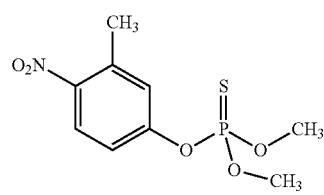

[Chem. 5]

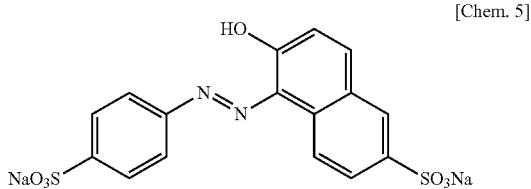

[Chem. 6]

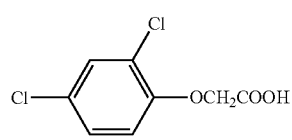

The wavelength of light, with which the visible light-responsive photocatalyst in the present invention is irradiated, is not particularly limited as long as it is visible light and the wavelength imparts photocatalytic activity. In view of particularly high catalytic activity, the wavelength is preferably from 400 to 700 nm, more preferably from 400 to 650 nm, and still more preferably from 400 to 600 nm.

The visible light-responsive photocatalyst of the present invention has activity power against molecules containing benzene ring or unsaturated bond if light source species are lights including visible light, such as sunlight. Since illuminance in the visible light region of a fluorescent lamp is about 90 times that in the ultraviolet light region, the present invention is useful in that it has visible light-responsive photocatalytic activity in indoor environment where the fluorescent lamp is used.

The disperse system is not particularly limited as long as it includes an oil liquid containing an organic titanium complex as a dispersant, and an aqueous dispersion containing gold colloids as a dispersoid. In view of higher yield, the disperse system is preferably a disperse system which forms a W/O-type microemulsion and a W/O-type emulsion. In view of being capable of imparting particularly high yield and high catalytic activity, the disperse system is preferably a disperse system which forms a W/O-type emulsion.

The W/O-type emulsion refers to a disperse system in which water is dispersed in oil. The W/O-type microemulsion refers to a disperse system in which water is dispersed in oil, especially in which the size of water droplets of an emulsion is about 100 nm or less.

The aqueous dispersion containing gold colloids to be used may be prepared by any method as long as it is a conventionally known method. It is possible to use an aqueous dispersion prepared, for example, by boiling an aqueous chloroauric acid solution while stirring, and adding a reducing agent such as sodium citrate, thus reducing by heating. Alternatively, gold ions may be reduced by a reducing agent. Since a substance capable of interacting with titanium ions exerts an influence on the preparation of a visible light-responsive photocatalyst intermediate, it is preferred that such substance is not contained.

In case the disperse system forms a W/O-type microemulsion, first, water containing an emulsifier is mixed with oil. Thereafter, emulsification is performed while stirring at high speed using a homogenizer or the like to form a W/O-type microemulsion. In that case, when it is not easy to directly form a W/O-type emulsion, after making an oil/water separation state in which an O/W-type microemulsion is formed in an aqueous phase and a W/O-type microemulsion is formed in an oil phase, respectively, a W/O-type microemulsion phase may be taken out. Subsequently, the aqueous dispersion containing gold colloids is held in the W/O-type microemulsion phase. By mixing the oil liquid containing an organic titanium complex, the organic titanium complex is hydrolyzed at a W/O-type microemulsion interface to cause clathration of gold colloids in the microemulsion, thus forming a clathrate.

In the W/O-type microemulsion, gold colloids are contained in almost all of the emulsion. Therefore, the amount of gold colloids to be used can be reduced, and thus making it possible to prepare a clathrate in high yield. The W/O-type microemulsion has a particle diameter of several tens nm.

In case the disperse system forms a W/O-type emulsion, an emulsifier and an aqueous dispersion containing gold colloids are added to an oil. Subsequently, when the oil liquid containing an organic titanium complex is mixed, the organic titanium complex is hydrolyzed at a W/O-type emulsion interface to cause clathration of gold colloids in the emulsion, thus forming a clathrate.

In the W/O-type emulsion, gold colloids are contained in almost all of the emulsion. The W/O-type emulsion has a particle diameter of 500 to 3,000 nm, and the amount of emulsifiable water is larger than that in the case of forming a W/O-type microemulsion. Therefore, it is possible to obtain in higher yield than that in the case of forming a W/O-type microemulsion.

In case the disperse system forms a W/O-type microemulsion or a W/O-type emulsion, emulsification is performed by conventional surfactant emulsification or three-phase emulsification.

The three-phase emulsification refers to an emulsification method using vesicles to be formed by amphiphiles, or a dispersant/emulsifying agent containing single-particulate biopolymer as a main component.

Examples of the vesicle formed of amphiphiles include, but are not limited to, derivatives of polyoxyethylene hardened castor oil, dialkylammonium derivatives, trialkylammonium derivatives, tetraalkylammonium derivatives, dialkenylammonium derivatives, trialkenylammonium derivatives, or derivatives of halogen salts of tetraalkenylammonium derivatives.

The biopolymer includes, for example, one or more biopolymers selected from the group consisting of polysaccharides produced from microorganisms; phospholipid; polyesters; polysaccharides such as starch derived from organisms; and chitosan Specific examples of polysaccharides produced by microorganisms include those produced from microorganisms using, as constituents, some saccharides selected from among monosaccharides such as ribose, xylose, rhamnose, fucose, glucose, mannose, glucuronic acid, and gluconic acid.

When using vesicles in three-phase emulsification, it is preferred to set an average particle diameter of the vesicles within a range from 8 nm to 500 nm in the case of forming an emulsion by the following reason. The particle diameter of less than 8 nm may lead to a decrease in sucking action due to the van der Waals force, and thus the vesicles are less likely to adhere to a surface of oil droplets. The particle diameter of more than 500 nm may fail to maintain a stable emulsion (see, for example, Japanese Unexamined Patent Application, Publication No. 2006-241424).

In case a W/O-type emulsion is formed, it is not necessary to use particles or a surfactant so as to stabilize emulsification. However, it is necessary to continuously stir until titanium alkoxides are completely hydrolyzed.

The oil liquid serving as a dispersant is not particularly limited and includes, for example, cyclohexane, liquid paraffin, gas oil, and the like. It is preferred to use an oil liquid which is less likely to remain during a post-treatment such as heating.

In the present invention, the drying step may be included so as to separate a clathrate. The separating method is not particularly limited, and a reaction product may be precipitated by a centrifugal separator, followed by the removal of the precipitate. In this case, the precipitate may be washed with acetone, alcohol, water, and the like.

The drying method is not particularly limited and, for example, the precipitate may be dried by heating. In that case, drying temperature or drying time, which enables drying of the clathrate, may be appropriately selected. Specifically, the clathrate may be dried at a temperature of 60 to 80° C.

The present invention may further include the step of heating the clathrate after drying. In this case, it is preferred to heat at a temperature lower than the temperature at which trivalent titania undergoes anatase phase transition. Specifically, the temperature is preferably lower than 350° C., more preferably lower than 300° C., and still more preferably lower than 250° C. In order to sufficiently remove the solvent, heating is preferably performed at 200° C. or higher. Also in view of being capable of imparting the highest activity to the catalyst, heating is preferably performed at 200° C. or higher. The heating time may be appropriately selected depending on the amount of the clathrate or the heating temperature. Too long heating time may cause transition to an anatase phase, and thus the heating time is preferably heating time which does not cause transition of trivalent titania to the anatase phase.

The above heating operation enables titanium hydroxide to undergo dehydration condensation. Titanium hydroxide is converted into trivalent titania through hydration condensation to form composite fine particles (Au/$TiO_x$) of trivalent titania and gold colloids.

The present invention may include the step of bonding the clathrate to a substrate on which a fixing agent is bonded, through a fixing agent. The fixing agent may be any one as long as it is capable of bonding the clathrate to the substrate through the fixing agent. Examples thereof include polyvalent metal alkoxide, alkoxysilane, and the like.

The polyvalent metal alkoxide specifically refers to titanium alkoxide, aluminum alkoxide, magnesium alkoxide, calcium alkoxide, barium alkoxide, lantern alkoxide, scandium alkoxide, ytterbium alkoxide, chromium alkoxide, and the like. In view of high bondability and high selectivity of reaction conditions, titanium alkoxides such as tetraethoxytitanium and tetrabutoxytitanium are preferable.

Specific examples of the alkoxysilane include silica alkoxides such as tetramethoxysilane, tetraethoxysilane (TEOS), and methyltriethoxysilane.

The substrate may be any one to which the fixing agent is bonded. In view of high intensity, inorganic materials such as glass and metal are preferably used. Glass is effective since glass transmits light and enables use of light from the side opposite to a surface on which the clathrate is fixed.

It is also possible to include the step of drying the clathrate after bonding to the substrate. The drying method is not particularly limited and, for example, the clathrate may be dried by heating. In that case, drying temperature or drying time, which enables drying of the clathrate, may be appropriately selected. Specifically, the clathrate may be dried at a temperature of 60 to 80° C. After drying, the clathrate may be washed with acetone, alcohol, water, and the like.

It is possible to further include the step of heating the dried clathrate after fixing to the substrate. In this case, it is preferred to heat at a temperature lower than the temperature at which trivalent titania undergoes anatase phase transition. Specifically, the temperature is preferably lower than 350° C., more preferably lower than 300° C., and still more preferably lower than 250° C. In order to sufficiently remove the solvent, heating is preferably performed at 200° C. or higher. Also in view of being capable of imparting the highest activity to the catalyst, heating is preferably performed at 200° C. or higher. The heating time may be appropriately selected depending on the amount of the clathrate or the heating temperature. Too long heating time may cause transition of trivalent titania to an anatase phase, and thus the heating time is preferably heating time which does not cause transition of trivalent titania to the anatase phase.

When an inorganic substance such as glass is used as the substrate, and a titanium alkoxide or a silica alkoxide is used as the fixing agent, the clathrate maybe bonded with the substrate by the step of heating the clathrate after drying. In this case, it is possible to bond by the following method.

A titanium alkoxide dissolved in oil such as cyclohexane is applied on glass, whereby, silanol group of the glass reacts with the titanium alkoxide to form a film of titanium hydroxide. The dispersion containing the clathrate is applied on titanium hydroxide on the glass, or the clathrate taken out from the disperse system is applied on titanium hydroxide on the glass. Titanium hydroxide in the clathrate is heated to undergo a condensation reaction. This condensation reaction enables bonding of the clathrate to the glass, through the fixing agent applied first.

In case the clathrate is bonded to the substrate by the above method, it is preferred that adhesion between the glass and the photocatalyst is strong enough to endure a peeling check test using a cellophane tape. It is also preferred in view of being capable of uniformly applying.

The amount of the photocatalyst to be bonded to the substrate is not particularly limited. In view of being capable of ensuring sufficient activity without waste in a small amount, the amount is preferably from 10 to 200 μg/$cm^2$. The amount is more preferably from 25 to 150 μg/$cm^2$, and still more preferably from 50 to 100 μg/$cm^2$.

It is possible to use, as a powder-type photocatalyst, a separated clathrate heated as it is. It is possible to use, as a substrate fixing-type photocatalyst, a fired clathrate bonded to the substrate. Use of either catalyst may be appropriately selected depending on applications. Since the catalyst is fixed, the substrate fixing photocatalyst is preferred in that it can be used in various applications where the photocatalyst is actually used, leading to wide selectivity. The thus prepared photocatalyst is colored violet due to trivalent titania, separately from coloration (red color) due to gold colloids.

When used as the catalyst over a long period of time, the decomposition product may be sometimes adsorbed on a surface of the catalyst. The substance adsorbed on the surface of the catalyst may decrease catalytic activity. The present invention may include the step of removing some adsorbed substances existing on a surface of the catalyst to regenerate activity.

As long as the adsorbed substance existing on the surface of the catalyst can be removed, any method can be used. For example, the adsorbed substance may be removed by washing with water or acetone. In view of being capable of decomposing the adsorbed substance to regenerate high catalytic activity, the adsorbed substance is preferably removed by heating.

In case the adsorbed substance is removed by heating to regenerate catalytic activity, it is preferred to heat at a temperature lower than the temperature at which trivalent titania undergoes anatase phase transition. Specifically, the temperature is preferably lower than 350° C., more preferably lower than 300° C., and still more preferably lower than 250° C. In order to sufficiently remove the solvent and the like, heating is preferably performed at 200° C. or higher. Also in view of being capable of imparting the highest activity to the catalyst, heating is preferably performed at 200° C. or higher. The heating time may be appropriately selected depending on the degree of contamination. Too long heating time may cause transition of tivalent titania to an anatase phase, and thus the heating time is preferably heating time which does not cause transition of trivalent titania to the anatase phase.

The adsorbed substance refers to a substance which inhibits activity of the photocatalyst. For example, it refers to a product formed when the substance to be decomposed is decomposed by the catalyst.

Photocatalytic Activity Measurement

Using UV-VIS Spectrophotometer (V-570, Jasco), activity of visible light-responsive photocatalyst was confirmed by UV-VIS measurement of a change in absorption intensity of a substance to be decomposed. Decomposition activity is measured under visible light irradiation conditions; visible light having a wavelength of longer than 470 nm, illuminance: 30.0 mW/cm$^2$, and a light source: 180 W metal halide lamp (Luminer Ace 180 Me, HAYASHI) or two 18 W fluorescent lamps (illuminance: 1.7 mW/cm$^2$). A colored glass filter (V-Y47, TOSHIBA CORPORATION) capable of removing less than 470 nm light included in the light source was used.

The catalyst to be used is a powder-type photocatalyst, or a substrate fixing-type photocatalyst. MO, tryptophan, quercetin, fenitrothion, Sunset Yellow, or 2,4-D is used as the substance to be decomposed. Activity is measured by using an aqueous solution of a substance to be decomposed. In case the substance to be decomposed is MO, MO is colored yellow and becomes a transparent aqueous solution after decomposed. Therefore, it is possible to visually confirm decomposition.

TEM Micrograph Observation

The shape of the thus prepared Au/TiO$_x$ is observed by using a transmission electron microscope (JEM-2000FX/EXII JEOL). With respect to a sample for TEM observation, composite fine particles are mounted in a dispersion state in a commercially available grid with a supporting film (Cu mesh: JEOL) by dropwise addition, and an operation of washing with organic solvents such as water and acetone is performed.

Structural Analysis of Au/TiO$_x$ Composite Fine Particles

The crystal state of the thus prepared Au/TiO$_x$ is measured by using XRD (Rad-rA, Rigaku) and composite fine particles formed into powders were laminated on a glass cell for X-ray measurement, followed by the measurement. Measurement conditions are as follows; divergence/scattering slit: ½ deg, light receiving slit: 0.15 mm, scan speed: 5°/min, scan step: 0.02°/min, scan axis: 2θ/θ, scan region: 20 to 100° C., and voltage/current: 40 kv/100 mA.

Thermal Analysis of Au/TiO$_x$ Composite Fine Particles

Thermophysical property of the thus prepared Au/TiO$_x$ is measured by Thermo Gravimetry Analyzer (TG-DTA6300, SEIKO). A measurement sample to be used is obtained by taking out the prepared fine particles, followed by drying to form into powders. The measurement is performed under the following conditions. Using a predetermined alumina pan (SEIKO), the temperature is raised from room temperature to 1,000° C. in air.

<Usage of Visible Light-responsive Photocatalyst>

The present invention encompasses a usage of a visible light-responsive photocatalyst comprising a clathrate in which at least a part of gold particles is clathrated by trivalent titanium oxide which is described later in this specification. The usage is not particularly limited, but photocatalytic activity to be exhibited by the visible light-responsive photocatalyst of the present invention is enhanced along with an increase in total illuminance of wavelengths within the range of 400 to 650 nm. From this viewpoint, the usage of the visible light-responsive photocatalyst of the present invention may preferably include a step of irradiating the visible light-responsive photocatalyst with light of which total illuminance of wavelengths within the range of 400 to 650 nm is 0.040 mW/cm$^2$ or more. The total illuminance of the wavelengths within the range of 400 to 650 nm of the light to be used for irradiation may more preferably be 0.045 mW/cm$^2$ or more, further preferably 0.18 mW/cm$^2$ or more, furthermore preferably 0.45 mW/cm$^2$ or more, yet furthermore preferably 0.9 mW/cm$^2$ or more. Since there is a correlation between the illuminance and a time period required for the catalyst to attain decomposition, the total illuminance may appropriately be decided depending on a required environment. The light to be used may or may not include a wavelength which is out of the range of 400 to 650 nm. As a matter of course, the light may be natural light including sunlight. A method of irradiating the visible light-responsive photocatalyst with the light having wavelengths within the range of 400 to 650 nm is not particularly limited, and a method of blocking wavelengths other than the wavelength of 400 to 650 nm by a filter or a method of using light having no other wavelengths than the wavelengths within the range of 400 to 650 nm may be employed. In the present specification, "total illuminance of wavelengths within the range of 400 to 650 nm" means a value obtained by integrating illuminance values of the wavelengths within the range of 400 to 650 nm. The total illuminance of the wavelengths within the range of 400 to 650 nm of light is measured by OPTOMETER P9710 SENSOR SN23257 (usable for 400 to 800 nm) (Gigahertz-Optik).

<Visible Light-responsive Photocatalyst>

The present invention encompasses a visible light-responsive photocatalyst comprising a clathrate in which a part of gold particles is clathrated by trivalent titanium oxide. According to the above-described preparation method of the present invention, the clathrate is formed by clathration of gold colloids due to titanium hydroxides, and the titanium hydroxides are converted into trivalent titanium oxide as a result of mutual condensation reaction. The clathrate in which gold particles of the gold colloids are clathrated by the trivalent titanium oxide is the visible light-responsive photocatalyst. In the clathrate, a part of each of the gold particles may be clathrated by the trivalent titanium oxide, or the entire gold particle may be covered with the trivalent titanium oxide. Usage of the visible light-responsive photocatalyst of the present invention are not particularly limited, but the visible light-responsive photocatalyst of the present invention does not exhibit satisfactory photocatalytic activity when the total illuminance of wavelengths within the range of 400 to 650 nm is too low as described above. Therefore, the visible light-responsive photocatalyst may be used in such a manner that it is irradiated with light of which total illuminance of wavelengths within the range of 400 to 650 nm is 0.040 mW/cm$^2$ or more.

EXAMPLES

Preparation of Gold Colloid Dispersion

Chlorauric(III) acid.tetrahydrate was dissolved in pure water to prepare a solution (48.56 mmol/dm$^3$). After weighing 1.0 cm$^3$ from this solution, pure water was added to prepare an aqueous 0.01% by mass chlorauric(III) acid solution in the total amount of 200 cm$^3$. The solution was boiled while stirring and, after boiling, 0.0135 g of NaBH$_4$ was added, followed by stirring for 3 hours to obtain a deep red gold colloid dispersion.

Visible Light-responsive Photocatalyst Intermediate Prepared by Formation of W/O-type Microemulsion An emulsifier was added to pure water such that the concentration of the emulsifier becomes 5% by mass to prepare a dispersion. Then, an oil agent was added such that the dispersion and the oil agent form a reverse microemulsion, followed by stirring at high speed using a homogenizer and further standing in a constant temperature bath for 1 hour. After standing, a gold colloid dispersion prepared in advance was added in the reverse microemulsion, thus holding the gold colloid dispersion in the reverse microemulsion. HCO-10 (derivative of polyoxyethylene hardened castor oil) was used as the emulsifier, and cyclohexane was used as the oil agent.

TEOT dissolved in cyclohexane was added to an external phase such that a ratio of TEOT to gold colloids held in the W/O-type microemulsion becomes a predetermined molar ratio. After the addition, TEOT was hydrolyzed to prepare Au/Ti(OH)$_4$. The hydrolysis reaction time of TEOT was set at 2 hours, and the temperature was set at 20±2° C.

Visible Light-responsive Photocatalyst Intermediate Prepared by Formation of W/O-type Emulsion To a gold colloid dispersion prepared in advance, HCO-10 was added so as to adjust the concentration to 5% by mass, followed by stirring to prepare a 5% by mass HCO-10/gold colloid dispersion. This dispersion was added to cyclohexane to form a W/O-type emulsion.

TEOT dissolved in cyclohexane was added to an external phase such that a ratio of TEOT to gold colloids held in the W/O-type emulsion becomes a predetermined molar ratio. After the addition, TEOT was hydrolyzed to prepare Au/Ti(OH)$_4$. The hydrolysis reaction time of TEOT was set at 2 hours, and the temperature was set at 20±2° C. At this time, preparation was performed such that a molar ratio of Ti to Au varies in a range of 1:1, 1:10, 1:50, 1:100, 1:500, and 1:1,000.

Visible Light-responsive Photocatalyst Intermediate Prepared from W/O-Type Emulsion without Using Emulsifier To TEOT dissolved in cyclohexane, a gold colloid solution was added dropwise so as to adjust to a predetermined molar ratio to prepare Au/Ti(OH)$_4$. The gold colloid solution was gradually added dropwise while stirring. In this case, a clathrate of gold colloids and titanium hydroxide became a sol-gel-like mixture and dispersed in an oil phase. However, the clathrate was precipitated when stirring was terminated.

Visible Light-responsive Photocatalyst Intermediate Prepared by Formation of Reversed Micelles (Comparative Example 1)

DE-5 (nonionic surfactant dodecylpentaoxyethylene monoether) was dissolved in cyclohexane to prepare a solution such that the concentration becomes 0.1 mol/dm$^3$ which is higher than the critical micelle concentration (cmc) of DE-5 surfactant. Subsequently, a gold colloid dispersion prepared in advance was solubilized in this solution. However, since the size of gold colloids (10 nm to 20 nm) is larger than that of reversed micelles, a W/O-type microemulsion was obtained, thus failing to prepare by the reversed micelles. The solubilization time was set at 2 hours, and the temperature was set at 20° C.±2° C.

TEOT dissolved in cyclohexane was added to an external phase and TEOT was hydrolyzed by the W/O-type microemulsion such that a ratio of TEOT to gold colloids held in the W/O-type microemulsion of Comparative Example becomes a predetermined molar ratio to prepare Au/Ti(OH)$_4$. The hydrolysis reaction time of TEOT was set at 2 hours, and the temperature was set at 20±2° C.

Preparation of Powder-Type Photocatalyst

To Au/Ti(OH)$_4$ prepared by each method, acetone was added, thus co-dissolving an oil phase and an aqueous phase to form a uniform liquid phase. Then, Au/Ti(OH)$_4$ was precipitated. In this case, gold colloids are not dispersed in the liquid phase and exist in a state of being included in a gel of titanium hydroxide. This washing operation was repeated twice to remove an inorganic substance or a soluble organic substance as much as possible through washing.

Subsequently, water was added, followed by stirring and further precipitation of the reaction product using a centrifugal separator. This operation of washing with water was performed twice to purify a gel through washing. The precipitate was taken out and then an Au/Ti(OH)$_4$ gel was dried at 80° C.

Furthermore, the dried gel was subjected to a heating treatment under atmosphere at 200 to 300° C. for 2 to 3 hours to remove the solvent remaining in the precipitate, and also titanium hydroxide is subjected to dehydration condensation to form into titanium oxide, thus obtaining Au/TiO$_x$. The Au/TiO$_x$ catalyst thus obtained was colored violet due to trivalent titania, separately from coloration due to gold colloids.

In the case of preparing by formation of a W/O-type microemulsion (Example 1), it was possible to prepare several tens to 100 mg of Au/TiO$_x$ per 100 ml of the emulsion. Water of the W/O-type microemulsion had a particle diameter of several tens nm. In the case of preparing by formation of a W/O-type emulsion (Example 2), it was possible to prepare several grams of Au/TiO$_x$ per 100 ml of the emulsion. Water of the W/O-type emulsion had a particle size of 500 to 3,000 nm. In the case of preparing by formation of reversed micelles (Comparative Example 1), it was possible to prepare several mili-grams of Au/TiO$_x$ per 100 ml of the reversed micelles. Water of the reversed micelles had a particle size of 2 to 3 nm. These results are shown in Table 1.

TABLE 1

|  | Example 1 | Example 2 | Comparative Example 1 |
|---|---|---|---|
| Diameter of water droplets | Several tens nm | 500~3000 nm | 2~3 nm |
| Yield | Several tens to 100 mg/100 ml | Several g/100 ml | Several mg/100 ml |

TEM Micrograph Observation

The shape of the thus prepared Au/TiO$_x$ was observed by using transmission electron microscope (JEM-2000FX/EXII JEOL). With respect to a sample for TEM observation, composite fine particles are mounted in a dispersion state in a commercially available grid with a supporting film (Cu mesh: JEOL) by dropwise addition, and an operation of washing with water and organic solvents such as acetone is performed. The results revealed that gold colloids are included in TiO$_x$. A microscopic regular structure was also observed in part.

Structural Analysis of Au/TiO$_x$ Composite Fine Particles

The crystal state of the thus prepared Au/TiO$_x$ was measured by using XRD (Rad-rA, Rigaku) and composite fine particles formed into powders were mounted on a glass cell for X-ray measurement, followed by the measurement. Measurement conditions are as follows; divergence/scattering slit: ½ deg, light receiving slit: 0.15 mm, scan speed: 5°/min, scan step: 0.02°/min, scan axis: 2θ/θ, scan region: 20 to 100° C., and voltage/current: 40 kv/100 mA. As a result, a diffraction peak was observed for Au/TiO$_x$ prepared by formation of a W/O-type emulsion, but failed to identify a crystal form. However, the sample was colored violet. If the heating temperature is 400° C. or higher, titanium oxide exhibits an anatase-type diffraction peak, and turns white.

Thermal Analysis of Au/TiO$_x$ Composite Fine Particles

Thermophysical property of the thus prepared Au/TiO$_x$ was measured by a differential thermo gravimetry analyzer (TG-DTA6300, SEIKO). A measurement sample to be used is obtained by taking out the prepared fine particles, followed by drying to form into powders. The measurement is performed under the following conditions. Using a predetermined alumina pan (SEIKO), the temperature is raised from room temperature to 1,000° C. in air. The results revealed that a gold colloid-containing titanium hydroxide exhibited an exothermic peak at 265.6° C. and, at the same time, the mass decreased and dehydration condensation occurred. TiO$_x$ containing no gold colloid was prepared by a W/O-type emulsion and thermal analysis thereof was performed. As a result, it exhibited an exothermic peak at 360° C. and anatase transit occurred.

Preparation of Substrate Fixing-Type Photocatalyst

A clean glass plate used for microscope slide preparation was used as a substrate. A fixing agent such as TEOT, TBOT or TEOS was thinly applied on a surface of a glass, followed by a reaction with silanol groups to form a film of titanium hydroxide. Using an applicator, Au/Ti(OH)$_4$ prepared by formation of a W/O-type emulsion was applied on the surface and then air-dried. The amount of the photocatalyst applied in the case of fixing to the substrate was set at a range from 50 to 100 μg/cm$^2$.

After washing with acetone and water, heating was performed at 200° C. for 3 hours to make a photocatalyst Au/TiO$_x$ catalyst. Adhesion between the glass substrate and the photocatalyst was enough to endure a peeling check test using a cellophane tape. As a result of SEM observation, coating uniformity was confirmed. Furthermore, all of TEOT (tetraethoxy titanate), TBOT (tetrabutoxy titanate) and TEOS (tetraethoxysilane) could be used as the fixing agent.

Activity of Powder-Type Catalyst

Activity confirmation test of a powder-type catalyst through irradiated with visible light was performed. Using UV-VIS Spectrophotometer (V-570, Jasco), catalytic activity was confirmed by UV-VIS measurement of a change in absorption intensity of a substance to be decomposed. Decomposition activity was measured under visible light irradiation conditions; visible light having a wavelength longer than 470 nm, illuminance: 30.0 mW/cm$^2$, and a light source: 180 W metal halide lamp (Luminer Ace 180 Me, HAYASHI). A colored glass filter (V-Y47, TOSHIBA CORPORATION) capable of removing less than 470 nm light included in the light source was used.

A visible light irradiation test of activity of a powder-type catalyst, which was prepared by formation of a W/O-type microemulsion, was performed. MO was used as a substance to be decomposed. The results are shown in FIG. 1. The results revealed that catalytic activity is the highest when heated at 200° C. This activity is the same as that in the case of preparing by formation of reversed micelles. It was found that trivalent titania can also be prepared other than when prepared by a reverse micelle method. The catalyst had the composition of Au:Ti=1:300 in terms of a molar ratio, and heating was performed for 3 hours.

Figure 2:
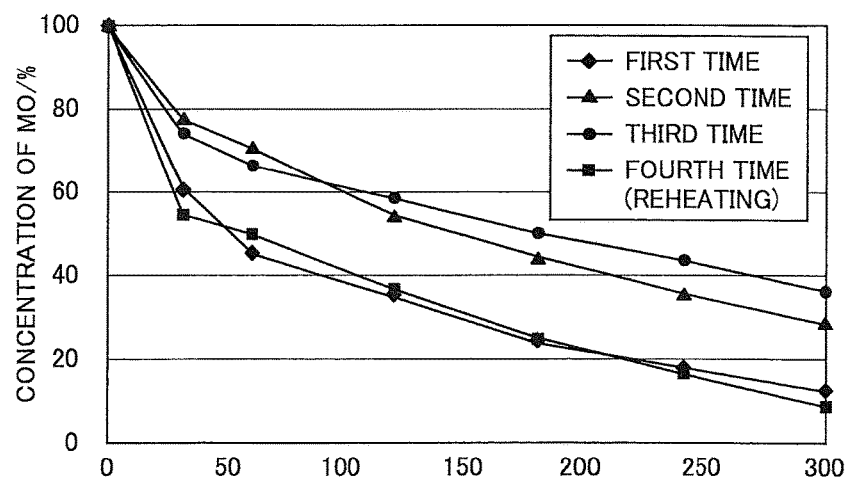
FIG. 2 is a graph showing that a powder-type visible light-responsive photocatalyst, which is obtained in an example of the present invention, undergoes reheating to regenerate activity.

A visible light irradiation test of activity of a powder-type catalyst, which was prepared by formation of a W/O-type emulsion stabilized by a three-phase emulsification method, was performed. Mo having a normal concentration was used as the substance to be decomposed. The results are shown in FIG. 2. Using the same catalyst repeatedly, a test was performed three times. After first decomposition, second and third decomposition tests were performed without replacing the catalyst. The speed of the second and third decomposition somewhat decreased. The reason is considered that the decomposition product is adsorbed on a surface of the catalyst to cause contamination. After third measurement of activity, when heated again at 200° C. for 3 hours, it was possible to obtain a decomposition speed which nearly reproduced the first measurement.

Decomposition Test by Irradiation with Fluorescent Lamp

Using two commercially available 18 W fluorescent lamps (illuminance of 1.7 mW/cm$^2$), decomposition activity was measured.

Figure 3:
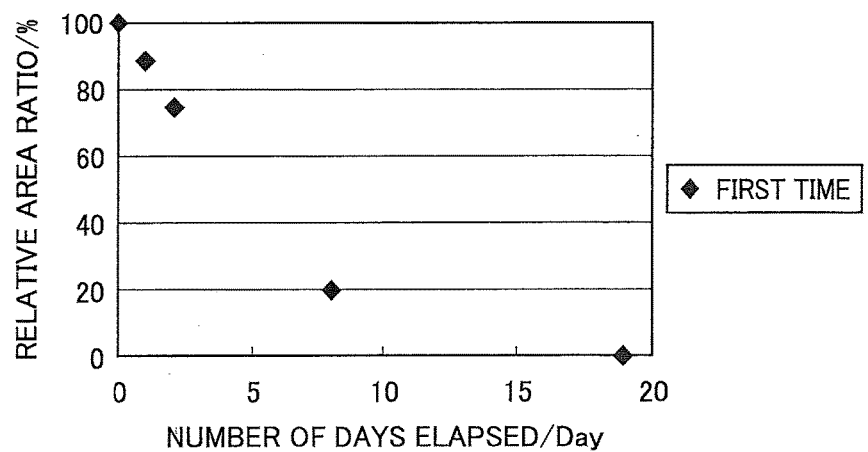
FIG. 3 is a graph showing that a powder-type visible light-responsive photocatalyst, which is prepared by forming a W/O-type emulsion in an example of the present invention, responds to visible light to be imparted with activity.
Figure 4:
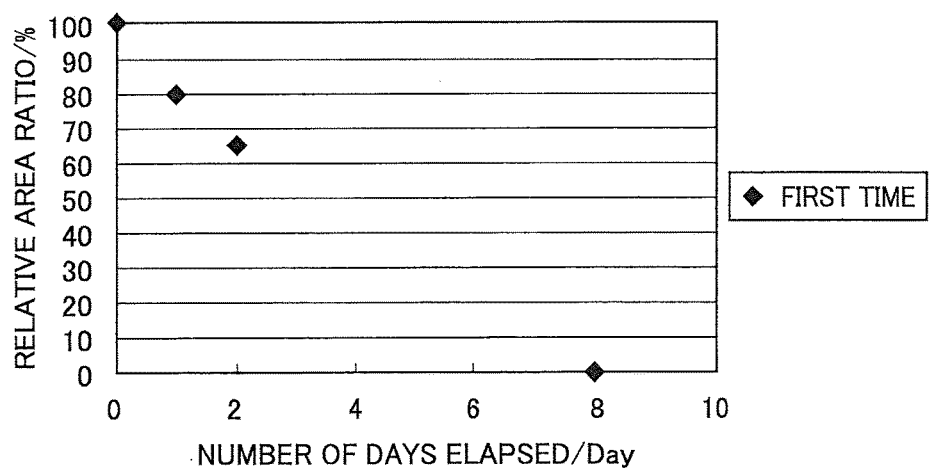
FIG. 4 is a graph showing that a powder-type visible light-responsive photocatalyst, which is prepared from a W/O-type emulsion without using an emulsifier in an example of the present invention, responds to visible light to be imparted with activity.

A comparison was made between activity of a powder-type catalyst prepared by formation of a W/O-type emulsion stabilized by a three-phase emulsification method, and that of a powder-type catalyst prepared without using an emulsion stabilizer. The results are shown in FIGS. 3 and 4. The results revealed that the powder-type catalyst prepared by formation of a W/O-type emulsion has higher activity, but the powder-type catalyst prepared without using an emulsion stabilizer has sufficient activity.

Activity of Substrate Fixing-Type Photocatalyst

Using a substrate fixing-type photocatalyst prepared by formation of a W/O-type emulsion stabilized by a three-phase emulsification method, a photodecomposition test was performed. Visible light conditions are the same as those in the case of the powder-type catalyst prepared by formation of a W/O-type emulsion stabilized by a three-phase emulsification method.

Figure 5:
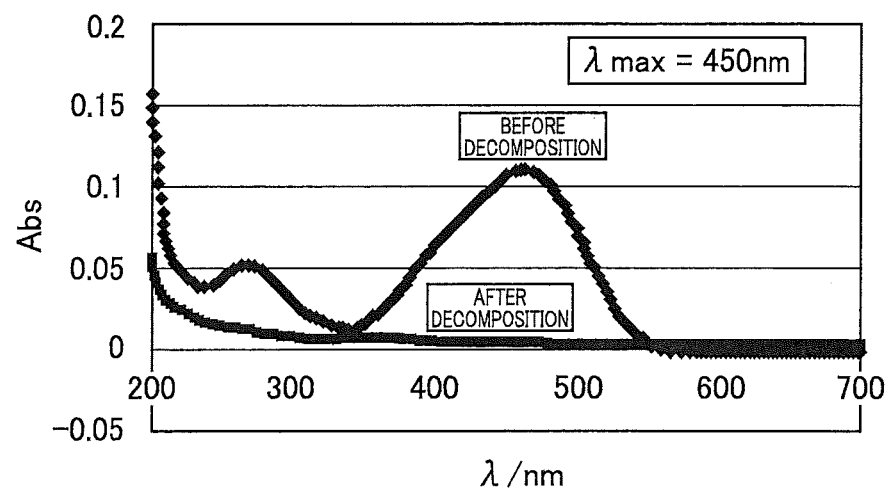
FIG. 5 is a graph showing that a substrate fixing-type visible light-responsive photocatalyst, which is prepared in an example of the present invention, has activity for decomposition of methyl orange.
Figure 6:
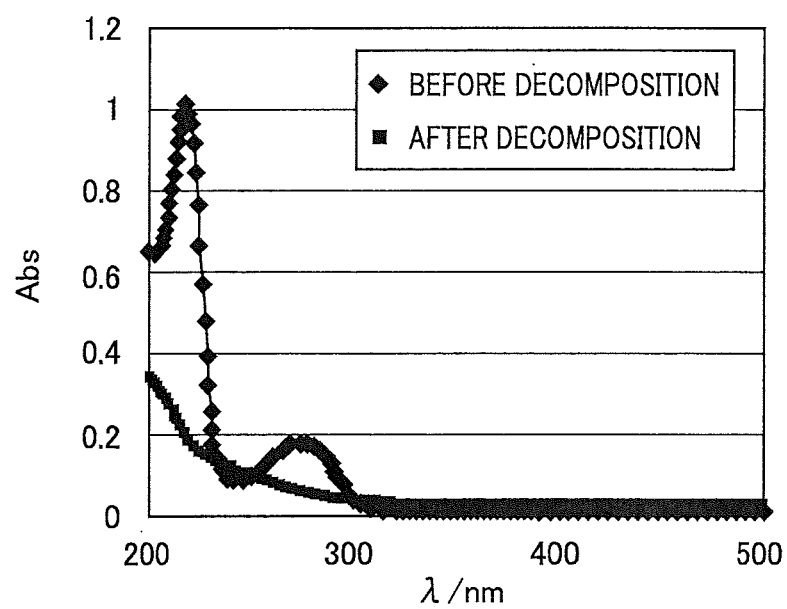
FIG. 6 is a graph showing that a substrate fixing-type visible light-responsive photocatalyst, which is prepared in an example of the present invention, has activity for decomposition of tryptophan.

A decomposition test of an aqueous MO solution and that of an aqueous tryptophan solution were performed. The results are shown in FIG. 5 and FIG. 6. In this case, the color of the aqueous MO solution was yellow before decomposition, whereas, it became a transparent aqueous solution after decomposed.

In a spectrum before decomposition, MO molecule has an absorption site in the visible region, while tryptophan molecule has an absorption site only in the ultraviolet region. However, in both cases, a peak of each absorption site of a spectrum disappeared after decomposition.

Figure 7:
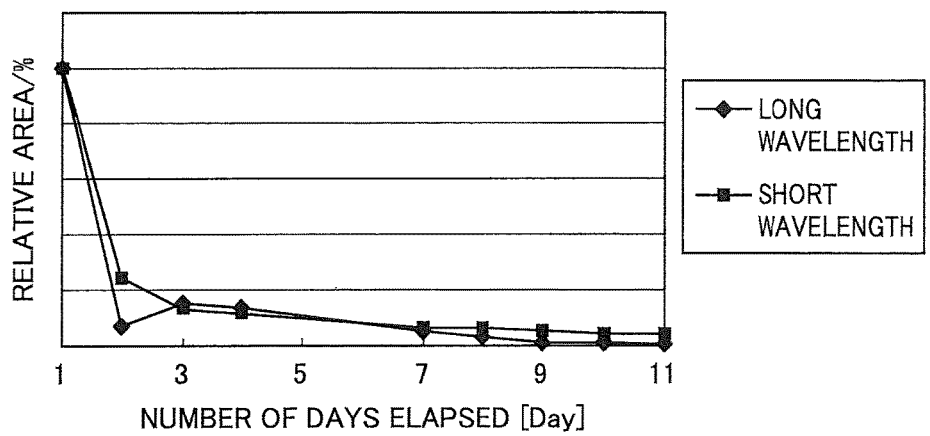
FIG. 7 is a graph showing that a substrate fixing-type visible light-responsive photocatalyst, which is prepared in an example of the present invention, has activity for decomposition of tryptophan.

FIG. 7 shows decomposition observed from two absorption peaks in tryptophan of amino acid. It was confirmed that, even in case where a light absorption site of a substance to be decomposed is only an ultraviolet light site, like tryptophan, it is possible to perform photodecomposition due to visible light. In other words, it is possible to say that the existence of a benzene ring site or an unsaturated site in a molecular structure suggests that a photocatalyst exhibits decomposition activity. It was confirmed that, among compounds other than tryptophan, quercetin as a dye, fenitrothion as a pesticide, Sunset Yellow as an edible yellow colorant, 2,4-D as a herbicide, and the like are also decomposed. The results revealed that compounds other than MO can undergo molecular decomposition by the photocatalyst in the present invention, as long as an unsaturated site such as benzene ring and double bond exists in part of the compound.

With respect to appearance of an aqueous MO solution before and after photodecomposition, the solution is colored yellow before decomposition since it has light maximum absorption at λmax 450 nm. After decomposition, all absorption peaks disappeared, and thus the solution became a transparent aqueous solution. Namely, it was confirmed that no influence is exerted on catalytic activity even in a fixed thin film state, thus enabling decomposition.

Figure 8:
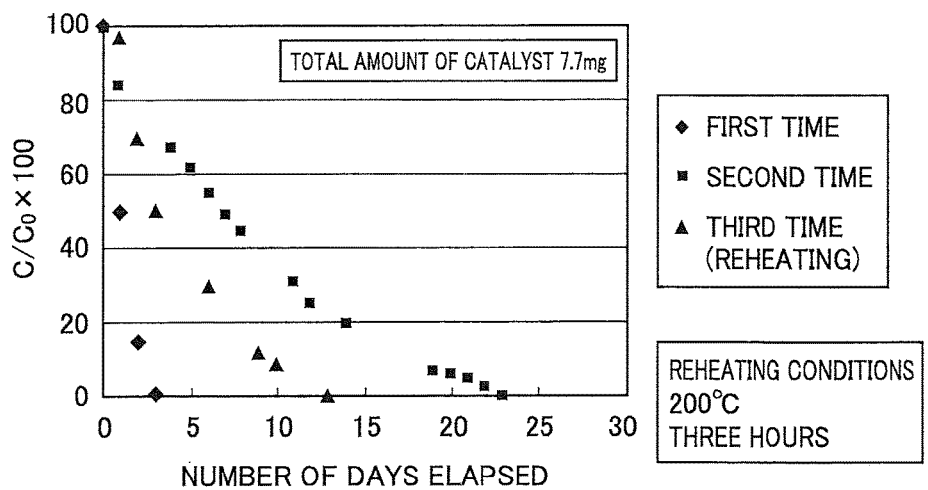
FIG. 8 is a graph showing that a substrate fixing-type visible light-responsive photocatalyst, which is prepared in an example of the present invention, undergoes reheating to regenerate activity.

FIG. 8 shows a time change in photodecomposition. It was confirmed that a decrease in catalytic activity is observed similar to the case of FIG. 1 when the same catalyst is repeatedly used once or twice, while reproducibility is exhibited when heated after used twice.

Figure 9:
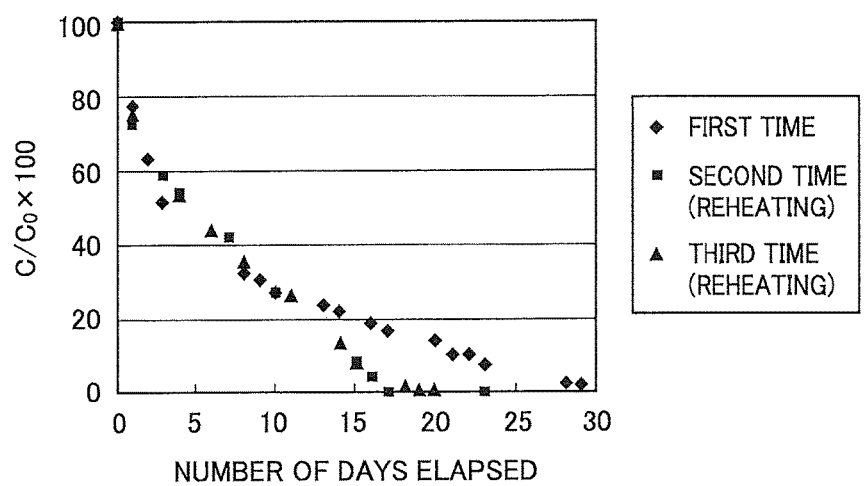
FIG. 9 is a graph showing that a substrate fixing-type visible light-responsive photocatalyst, which is prepared in an example of the present invention, undergoes reheating to regenerate activity.

In order to clarify an influence of heating of a catalyst on catalytic activity, first decomposition was performed and, after heating, second decomposition was performed. After completion of the second decomposition, third decomposition was performed by performing second heating. The results are shown in FIG. 9. Deterioration due to heating was not recognized. Or rather, it became apparent that reproducibility of catalytic activity due to heating is maintained.

Figure 10:
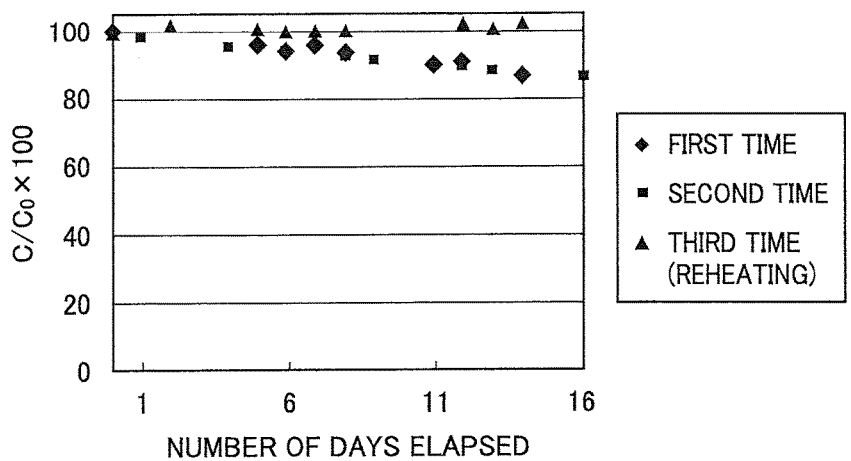
FIG. 10 is a graph showing that a visible light-responsive photocatalyst, which is prepared in an example of the present invention, loses activity after heating under the conditions that titanium oxide is converted into an anatase-type titanium oxide.

Au/TiO$_x$ was converted into an anatase-type by heating at a heating temperature of 400° C. for 3 hours, and then catalytic activity was examined. The results are shown in FIG. 10. The results revealed that the titanium oxide heated at 400° C. cannot decompose MO by visible light. This is because the anatase-type Au/TiO$_2$ does not have the catalytic activity in the visible light region.

Based on the above results, it was confirmed that a phenomenon such as reactivation of the catalyst due to repeated test and heating is the same as in the powder-type catalyst. Namely, it was found that activity of a substrate fixing-type photocatalyst has photocatalytic activity similar to activity of a powder-type photocatalyst.

It was confirmed whether or not Au/TiO$_x$, which was prepared by using, as a light source, two 18 W fluorescent lamps in place of a 180 W metal halide lamp, has visible light-responsive photocatalytic activity. The obtained illuminance (μW/cm$^2$) is shown in Table 2.

TABLE 2

| Illuminance of fluorescent lamp | |
|---|---|
| 310~410 nm | 400~800 nm |
| 20.8 μw/cm$^2$ | 1664 μw/cm$^2$ |

It was confirmed that, since illuminance in the visible light region of sunlight is more than 10 times that in the ultraviolet light region, visible light exists in abundance even when using a fluorescent lamp. When ultraviolet light is blocked by using a colored glass filter, photocatalytic activity was confirmed. This fact revealed that Au/TiO$_x$ exhibits activity power to molecules including a benzene ring or unsaturated bond if light source species are lights including visible light, such as sunlight.

<Evaluation of Photocatalytic Activity when Irradiated with Mercury Fluorescent Lamp or White LED Fluorescent Lamp>

Figure 11:
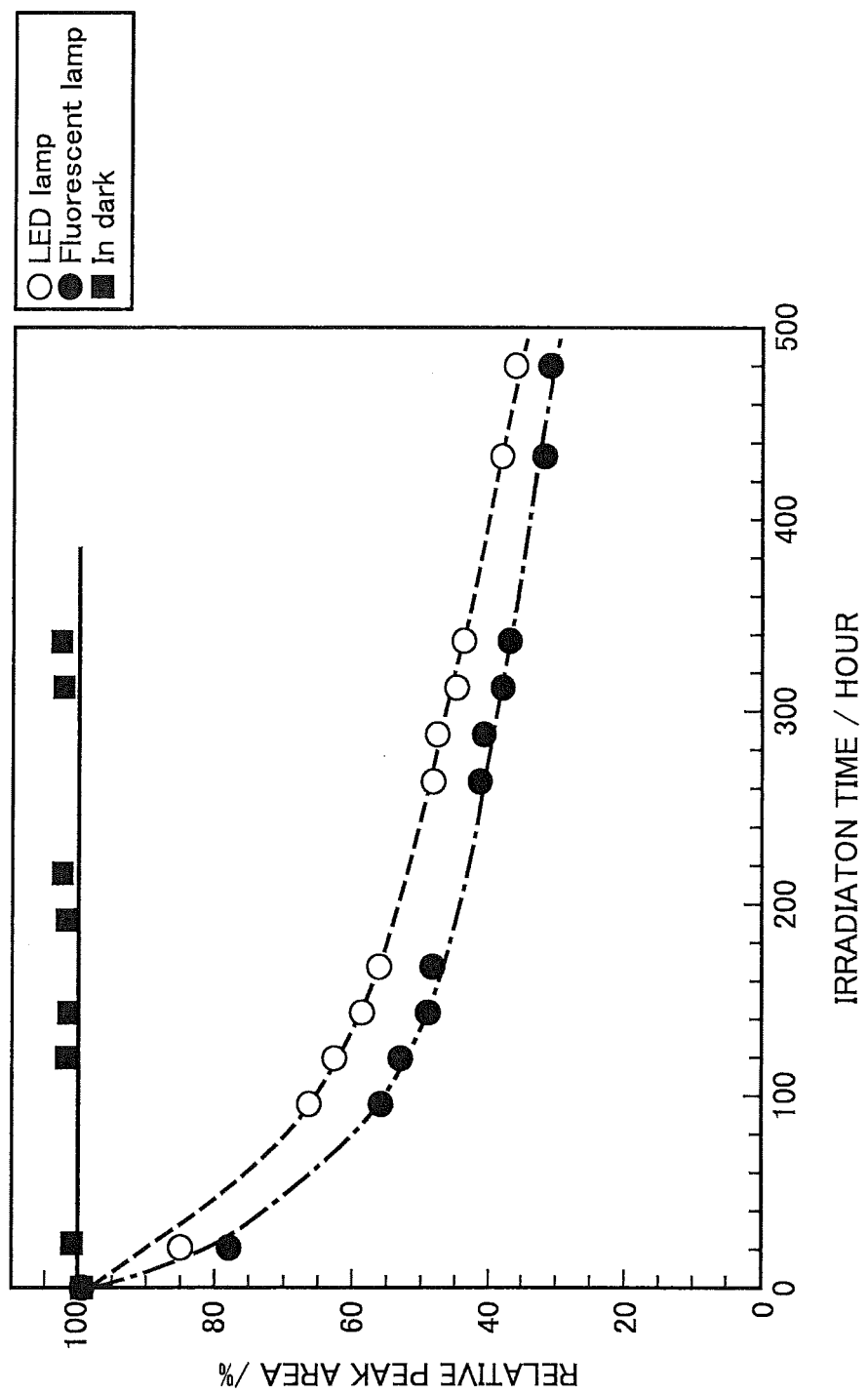
FIG. 11 is a graph showing that a substrate fixing-type visible light-responsive photocatalyst, which is prepared in an example of the present invention, decomposes methyl orange when irradiated with light from a mercury fluorescent lamp or a white LED fluorescent lamp.

Whether or not Au/TiO$_x$ exhibits photocatalytic activity when irradiated with light from a mercury fluorescent lamp or a white LED fluorescent lamp was evaluated. In the evaluation, 150 g of an aqueous MO solution (0.015 mmol/L) and a mercury fluorescent lamp (1.77 mW/cm$^2$) or a white LED fluorescent lamp (1.54 mW/cm$^2$) were used, and photocatalytic activity of the above-described substrate fixing-type photocatalyst prepared by forming a W/O emulsion stabilized by the three-phase emulsification method was evaluated. The photodecomposition activity in the case of using the mercury fluorescent lamp or white LED fluorescent lamp is shown in FIG. 11. In FIG. 11, "LED lamp" indicates the irradiation with the white LED fluorescent lamp; "Fluorescent lamp" indicates the irradiation with the mercury fluorescent lamp; and "In dark" indicates that no irradiation was performed. The catalytic activity was confirmed by a UV-vis measurement of changes in absorption intensity of the substance to be decomposed using a UV-vis Spectrophotometer (V-570, Jasco).

Figures 12A, 12B:
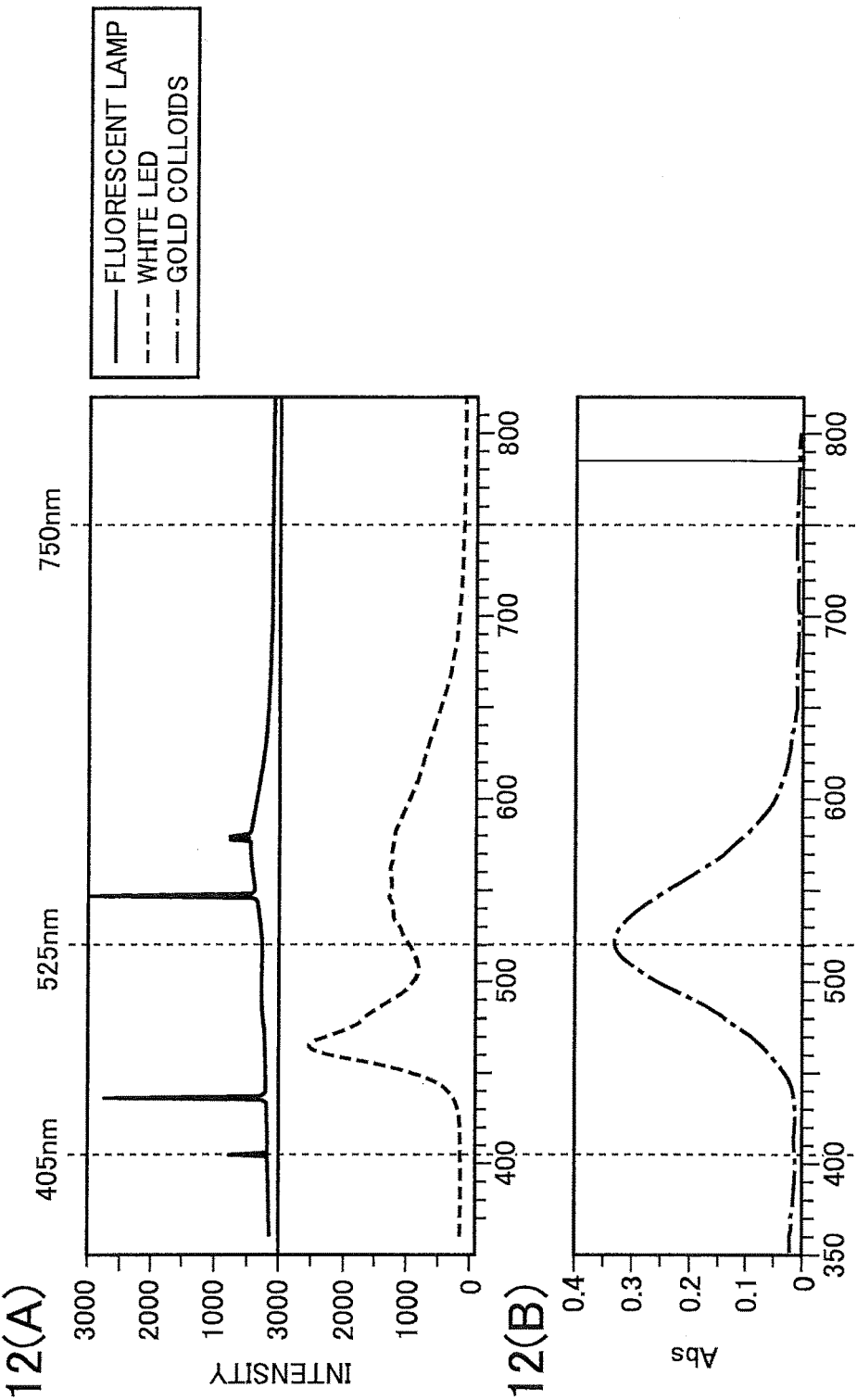
FIG. 12(A) is a graph showing wavelength distributions of the mercury fluorescent lamp and the white LED fluorescent lamp.
FIG. 12(B) is a graph showing an absorption wavelength of gold colloids.

As shown in FIG. 11, it was confirmed that Au/TiO$_x$ exhibits the photocatalytic activity when irradiated with the light from the mercury fluorescent lamp or white LED fluorescent lamp. Further, wavelength distributions of the mercury fluorescent lamp and white LED fluorescent lamp and an absorption wavelength of the gold colloids are shown in FIG. 12. As shown in FIG. 12(A), it was confirmed that the substrate-fixing type photocatalyst exhibits the photocatalytic activity to the light from the mercury fluorescent lamp or white LED fluorescent lamp having the wavelength band in the visible light region. Also, it was suggested that the higher photocatalytic activity attained by using the mercury fluorescent lamp is attributable to the higher illuminance of the mercury fluorescent lamp.

<Evaluation of Photocatalyst Activities when Irradiated with Various Wavelengths>

Changes in photocatalytic activity exhibited by Au/TiO$_x$ when irradiated with various wavelengths were evaluated by varying the wavelength of light from the white LED fluorescent lamp. In the evaluation, 150 g of an aqueous MO solution (0.01 mmol/L) was used; the illuminance was set to 15.3 mW/cm$^2$: and irradiation with a wavelength of 405 nm, 525 nm, or 750 nm was performed. As a catalyst, the above-described substrate fixing-type photocatalyst prepared by forming a W/O emulsion stabilized by the three-phase emulsification method was used, and an amount of the catalyst was 149.3 μg/cm$^2$. The catalytic activity was confirmed by a UV-VIS measurement of changes in absorption intensity of the substance to be decomposed using the UV-vis Spectrophotometer (V-570, Jasco).

Figure 13:
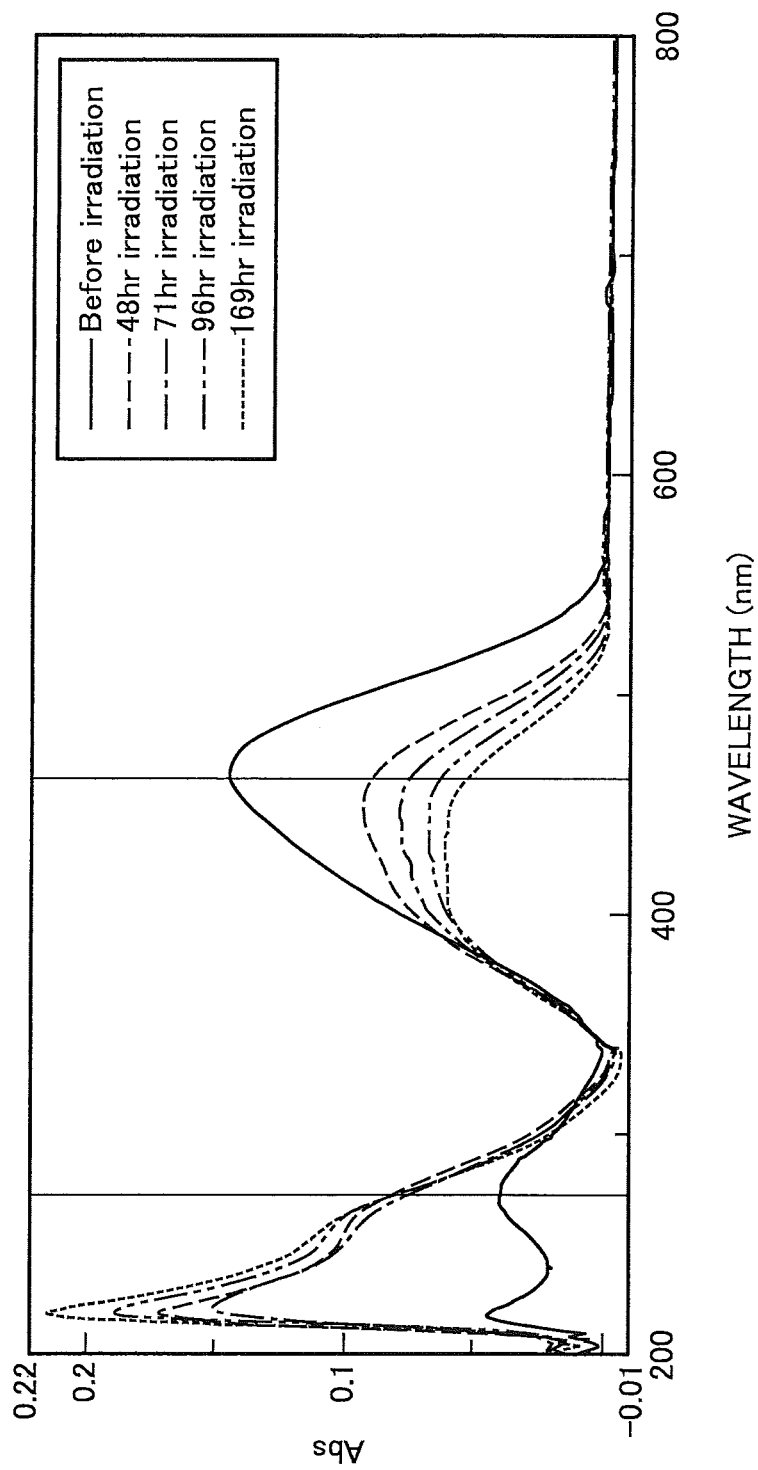
FIG. 13 is a graph showing that a substrate fixing-type visible light-responsive photocatalyst, which is prepared in an example of the present invention, decomposes methyl orange when irradiated with light having a wavelength of 525 nm from a white LED fluorescent lamp.

FIG. 13 shows temporal changes of an absorption wavelength of the aqueous MO solution in the case where the substrate-fixing type photocatalyst was irradiated with the light having wavelength of 525 nm from the LED lamp. As shown in FIG. 13, it was confirmed that $Au/TiO_x$ decomposes MO when irradiated with the wavelength of 525 nm.

Figure 14:
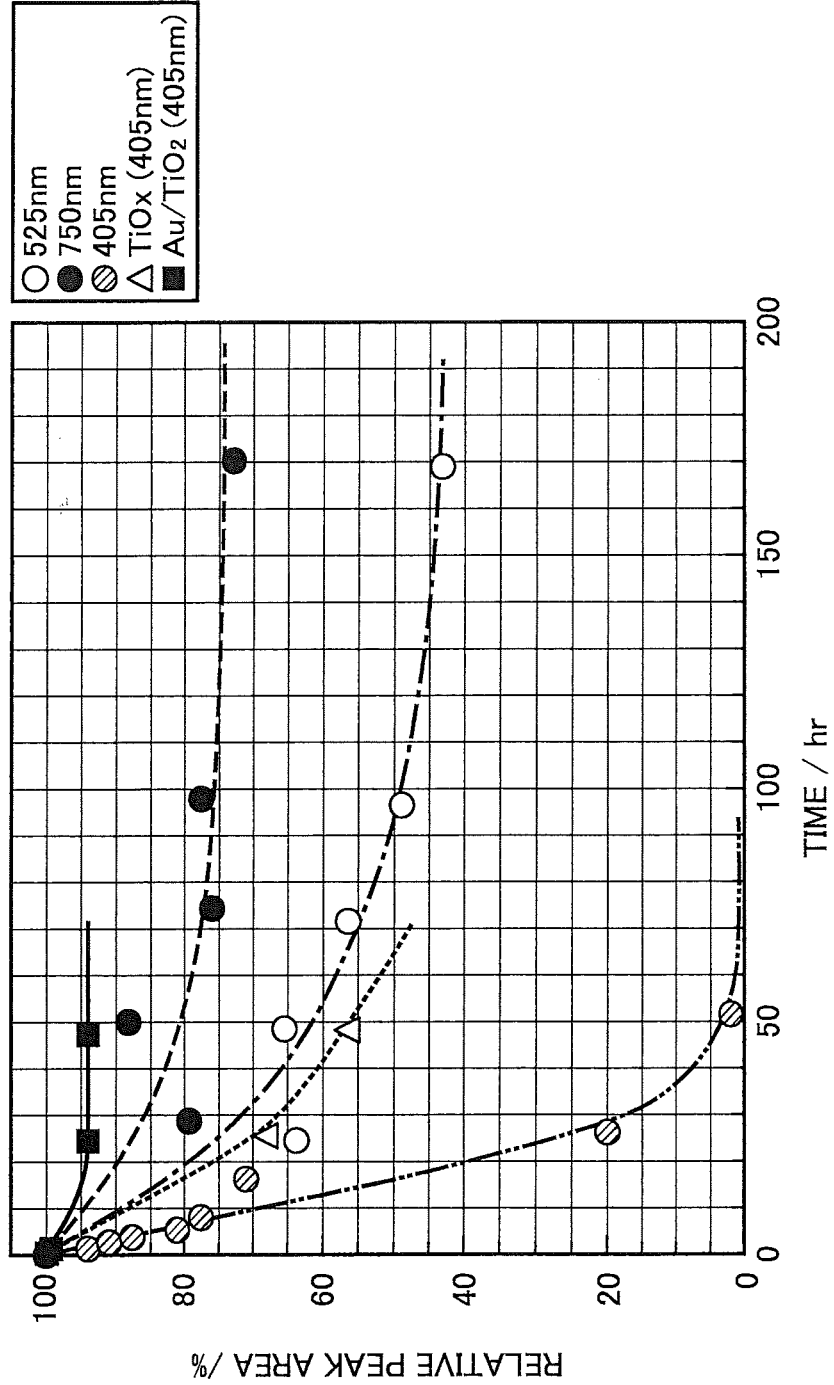
FIG. 14 is a graph showing that an absorption peak near 465 nm of methyl orange is reduced when a substrate fixing-type visible light-responsive photocatalyst, which is prepared in an example of the present invention, is irradiated with light having a wavelength of 525 nm, 750 nm, or 405 nm from each LED lamp.
Figure 15:
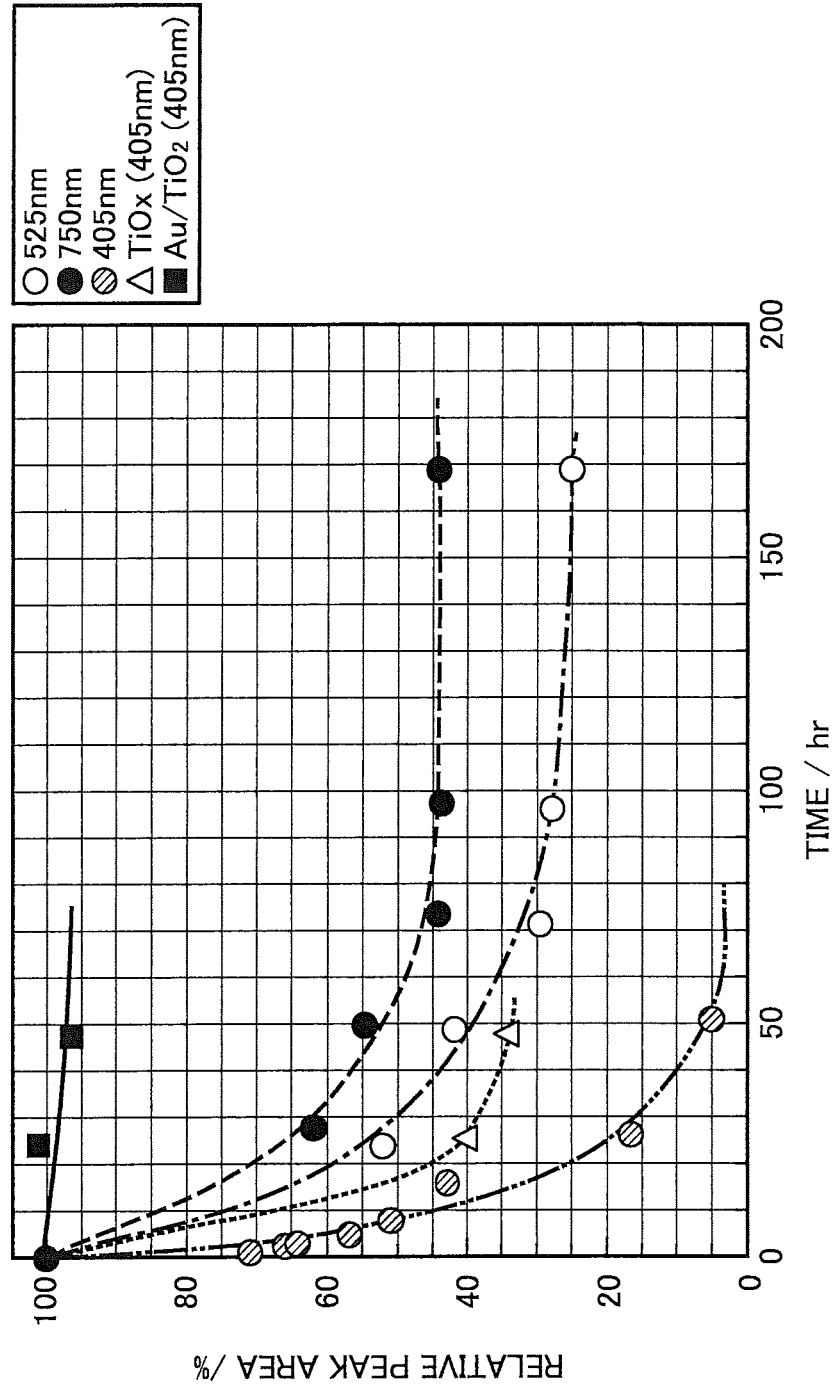
FIG. 15 is a graph showing that an absorption peak near 280 nm of methyl orange is reduced when a substrate fixing-type visible light-responsive photocatalyst, which is prepared in an example of the present invention, is irradiated with light having a wavelength of 525 nm, 750 nm, or 405 nm from each LED lamp.

FIGS. 14 and 15 show temporal change rates of an absorption wavelength for the aqueous MO solution in the case where the substrate-fixing type photocatalyst was irradiated with the light having wavelength of 405 nm, 525 nm, or 750 nm. In FIGS. 14 and 15, "$TiO_x$ (405 nm)" indicates that titanium oxide was used as the catalyst, and irradiation with the wavelength of 405 nm was performed. "$Au/TiO_2$ (405 nm)" indicates that tetravalent titanium oxide which underwent anatase phase transition was used as the catalyst, and irradiation with the wavelength of 405 nm was performed. "405 nm," "525 nm," or "750 nm" indicates that $Au/TiO_x$ was irradiated with each wavelength. Further, FIG. 14 indicates the temporal change rate of an absorption peak of MO near 465 nm (diazo bond), and FIG. 15 indicates the temporal change rate of an absorption peak of MO near 280 nm (benzene ring).

As shown in FIGS. 14 and 15, it was confirmed that "$Au/TiO_2$" obtained by using tetravalent titanium oxide scarcely exhibits the photocatalytic activity when irradiated with the wavelength of 405 nm. On the other hand, it was confirmed that $Au/TiO_x$ exhibits the photocatalytic activity to visible lights having the wavelength of 405 nm, 525 nm, or 750 nm. Particularly, it was confirmed that the MO decomposition speed of $Au/TiO_x$ is increased along with the reduction in wavelength to be irradiated as 750 nm, 525 nm, and 405 nm. This fact reveals that Au/TiOx has the catalytic activity to the visible light, and that the catalytic activity depends on a length of the wavelength.

Further, in view of the fact that the activity of the visible light-responsive photocatalyst of the present invention is increased along with the reduction in wavelength to be irradiated as 750 nm, 525 nm, and 405 nm, it was suggested that the particularly high activity of the visible light-responsive photocatalyst of the present invention is exhibited when a ratio of a wavelength region near 405 nm is larger than a ratio of entire wavelengths.

<Evaluation of Photocatalytic Activity of Lights from Mercury Fluorescent Lamp and White LED Fluorescent Lamp Having Identical Illuminance>

Figure 16:
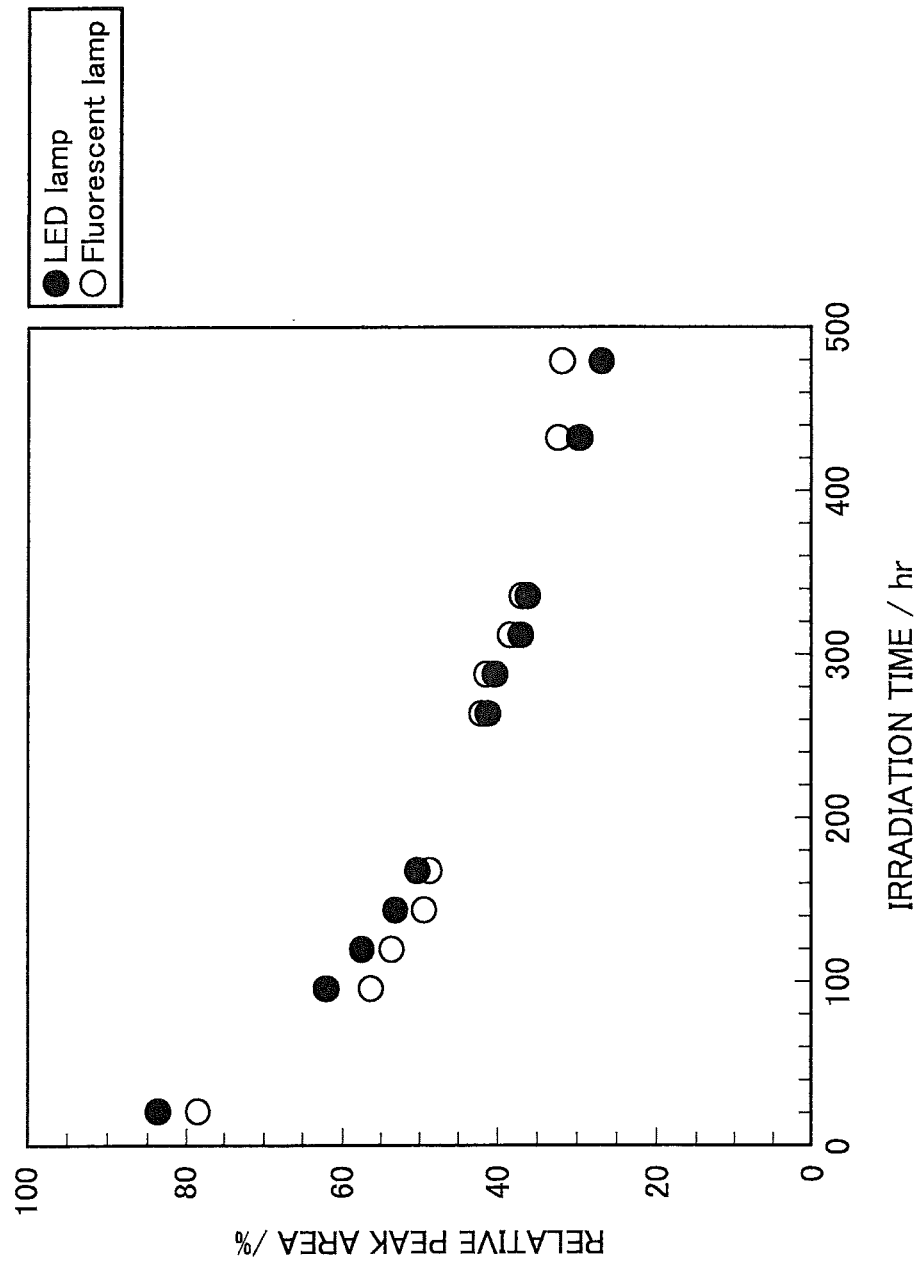
FIG. 16 is a graph showing a relationship between a time period during which the light from the mercury fluorescent lamp or white LED fluorescent lamp is irradiated and a residual ratio of methyl orange in the case where the illuminance of the white LED fluorescent lamp of the graph shown in FIG. 11 is corrected to be a value equal to the illuminance of the mercury fluorescent lamp of the graph shown in FIG. 11 and the residual ratio of methyl orange of the graph shown in FIG. 11 is corrected in accordance with the illuminance correction.

In the above-described "Evolution of Photocatalytic Activity When Irradiated with Mercury Fluorescent Lamp or White LED Fluorescent Lamp", the illuminance of the light from the mercury fluorescent lamp was set to 1.77 $mW/cm^2$, and the illuminance of the light from the white LED fluorescent lamp was set to 1.54 $mW/cm^2$. In the present evaluation, the illuminance of the light from the white LED fluorescent lamp was corrected to "1.77 $mW/cm^2$", and the methyl orange residual rates were corrected in accordance with the illuminance correction. The results are shown in FIG. 16. In FIG. 16, "LED lamp" indicates the irradiation with white LED fluorescent lamp, and "Fluorescent lamp" indicates the irradiation with mercury fluorescent lamp.

As shown in FIG. 16, the photocatalytic activities of the present invention to the lights from the mercury fluorescent lamp and the white LED fluorescent lamp having the identical illuminance are substantially identical to each other.

As described above, it was indicated that the photocatalytic activities to the lights from the mercury fluorescent lamp and the white LED fluorescent lamp of the present invention are substantially the same when the illuminance values of the lights from the mercury fluorescent lamp and the white LED fluorescent lamp are the same. However, in view of the fact that the activity of the visible light-responsive photocatalyst of the present invention is enhanced along with the reduction in wavelength as can be seen with 525 nm and 405 nm although the photocatalytic activity of the present invention is smaller when irradiated with the light having wavelength of 750 nm, it is assumed that a predetermined value of the illuminance near 405 nm is required for the visible light-responsive photocatalyst of the present invention to exhibit the photocatalytic activity. Accordingly, in the light of the mercury fluorescent lamp, a ratio of an integrated intensity of wavelengths within the range of 400 to 650 nm to an integrated intensity of wavelengths within the range of 380 to 810 nm was measured from area ratios of light intensities of the wavelengths within the ranges of the mercury fluorescent lamp of FIG. 12 to find that the ratio was 95%. In addition, in the light of the white LED fluorescent lamp, a ratio of an integrated intensity of wavelengths within the range of 400 to 650 nm to an integrated intensity of wavelengths within the range of 380 to 810 nm was measured from area ratios of light intensities of the wavelengths within the ranges of the white LED fluorescent lamp of FIG. 12 to find that the ratio was 90.5%. From the result, it was suggested that a certain amount of total illuminance of the wavelengths within the range of 400 to 650 nm is required for the substrate-fixing type photocatalyst of the present invention to exhibit the photocatalytic activity.

<Evaluation of Photocatalytic Activities Varied by Difference in Illuminance>

The influences exerted by $Au/TiO_x$ onto the photocatalytic activity were evaluated by varying the illuminance of light with which the photocatalyst was irradiated. In the evaluation, 150 g of an aqueous MO (methyl orange) solution (0.015 mmol/L, room temperature) was used as a solution to be decomposed. As a catalyst, the above-described substrate fixing-type photocatalyst prepared by forming a W/O emulsion stabilized by the three-phase emulsification method was used, and an amount of the catalyst was 149.3 $\mu g/cm^2$. A mercury fluorescent lamp was used as a light source. The evaluation was conducted on seven illuminance values of 0.0104 $mW/cm^2$, 0.0507 $mW/cm^2$, 0.2503 $mW/cm^2$, 0.661 $mW/cm^2$, 1.54 $mW/cm^2$, 8.011 $mW/cm^2$, and 15.3 $mW/cm^2$. The catalytic activity was confirmed by a UV-vis measurement of a change in absorption intensity of the substance to be decomposed using a UV-vis Spectrophotometer (V-570, Jasco).

Figure 17:
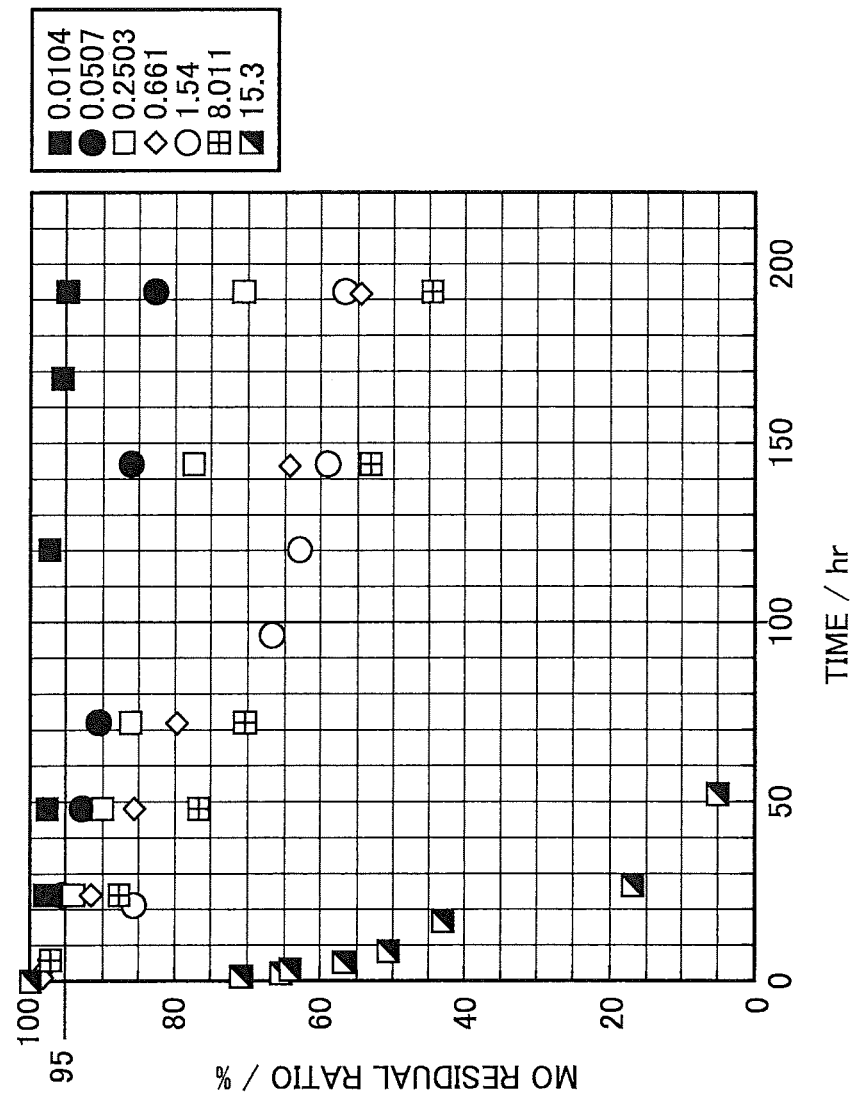
FIG. 17 is a graph showing a relationship between a light irradiation period and a methyl orange residual ratio when irradiating a substrate fixing-type visible light-responsive photocatalyst, which is prepared in an example of the present invention, with light of various values of illuminance from a mercury fluorescent lamp.

By taking a measurement error into consideration, illuminance which enables decomposition of 5% or more of the photocatalyst when the irradiation was continued for 100 hours, was used as a reference value of the illuminance which is capable of effective photodecomposition. As shown in FIG. 17, it was difficult to determine that methyl orange was decomposed at 0.0104 $mW/cm^2$, but it was confirmed that the illuminance of 0.0507 $mW/cm^2$ or more causes the decomposition. Further, it was confirmed that the methyl orange decomposition rate is increased along with the increase in illuminance.

From the above results and the ratio of the integrated intensity of the wavelengths within the range of 400 to 650 nm to the integrated intensity of the wavelengths within the range of 380 to 810 nm, it was revealed that the total illuminance of the wavelengths within the range of 400 to 650 nm of the light to be used for irradiation is necessarily 0.040 mW/cm² or more in order that the substrate-fixing type photocatalyst of the present invention exhibits the photocatalytic activity.

What is claimed is:

1. A method for preparing a visible light-responsive photocatalyst or a visible light-responsive photocatalyst intermediate, the method comprising:
   preparing a dispersant comprising an oil liquid containing an organic titanium complex,
   preparing a dispersoid comprising an aqueous dispersion containing gold colloids,
   forming a disperse system comprising the dispersant, and the dispersoid,
   then hydrolyzing the organic titanium complex to cause clathration of gold colloids, thus forming a clathrate,
   wherein, in the step of forming the disperse system, the organic titanium complex and the gold colloids are used in an amount such that a molar ratio of Au:Ti becomes 1:200 to 1:1,000, and
   wherein the dispersant is mixed with the dispersoid to form a water-in-oil emulsion or a water-in-oil microemulsion.

2. The method according to claim 1, further comprising the step of separating the clathrate from the disperse system.

3. The method according to claim 2, further comprising the step of heating the clathrate at a temperature lower than an anatase phase transition temperature or a temperature lower than 350° C.

4. The method according to claim 2, further comprising the step of firing the clathrate at a temperature of 200° C. or higher and lower than an anatase phase transition temperature or 350° C.

5. The method according to claim 1, further comprising the step of bonding the clathrate to a substrate on which a fixing agent is bonded, through the fixing agent.

6. The method according to claim 5, wherein the fixing agent contains a polyvalent metal alkoxide or an alkoxysilane.

7. The method according to claim 5, further comprising the step of drying the clathrate fixed to the substrate.

8. The method according to claim 7, further comprising the step of heating the clathrate after drying at a temperature lower than an anatase phase transition temperature or a temperature lower than 350° C.

9. The method according to claim 1, further comprising the step of removing some adsorbed substances existing on a surface of the visible light-responsive photocatalyst to regenerate catalytic activity.

10. The method according to claim 1, wherein the oil liquid includes cyclohexane, liquid paraffin, or gas oil.

* * * * *